(12) United States Patent
Park et al.

(10) Patent No.: US 8,781,419 B2
(45) Date of Patent: Jul. 15, 2014

(54) METHOD OF COOPERATIVE DATA TRANSMISSION BETWEEN TERMINALS AND A METHOD OF RECEIVING DATA

(75) Inventors: Sungho Park, Anyang-si (KR); Sunam Kim, Anyang-si (KR); Binchul Ihm, Anyang-si (KR); Jinyoung Chun, Anyang-si (KR); Jiwon Kang, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/641,965

(22) PCT Filed: Apr. 18, 2011

(86) PCT No.: PCT/KR2011/002755
§ 371 (c)(1),
(2), (4) Date: Oct. 18, 2012

(87) PCT Pub. No.: WO2011/132898
PCT Pub. Date: Oct. 27, 2011

(65) Prior Publication Data
US 2013/0034136 A1 Feb. 7, 2013

Related U.S. Application Data

(60) Provisional application No. 61/325,352, filed on Apr. 18, 2010, provisional application No. 61/325,385, filed on Apr. 19, 2010, provisional application No. 61/333,236, filed on May 10, 2010.

(51) Int. Cl.
*H04B 1/04* (2006.01)

(52) U.S. Cl.
USPC .... 455/127.1; 455/127.2; 455/62; 455/67.11; 455/522

(58) Field of Classification Search
CPC ............................ H03G 3/3042; H04W 16/14
USPC ........... 455/127.7, 127.1, 62, 67.11, 522, 127
See application file for complete search history.

(56) References Cited

U.S. PATENT DOCUMENTS

| 5,872,770 A * | 2/1999 | Park et al. .................. 370/241.1 |
| 2010/0105332 A1* | 4/2010 | McHenry et al. ............... 455/62 |
| 2010/0128703 A1* | 5/2010 | Brand et al. .................. 370/338 |

FOREIGN PATENT DOCUMENTS

| KR | 1020080101269 | 11/2008 |
| KR | 1020090081143 | 7/2009 |
| KR | 1020100035088 | 4/2010 |

OTHER PUBLICATIONS

PCT International Application No. PCT/KR2011/002755, Written Opinion of the International Searching Authority, dated Nov. 29, 2011, 17 pages.

*Primary Examiner* — Sanh Phu
(74) *Attorney, Agent, or Firm* — Lee, Hong, Degerman, Kang & Waimey

(57) ABSTRACT

The present invention relates to a method for reducing power consumption when performing the cooperative transmission in a cooperative transmission system, the method comprising: defining a cooperative transmission participation rate or a cooperative transmission non-participation rate to adjust the participation rate of at least one terminal capable of cooperative transmission within at least one cooperative cluster, the participation rate adjustment being carried out in the at least one terminal capable of cooperative transmission by generating a random value having a preset range; comparing the generated random value with a threshold as a reference indicating whether a corresponding terminal is participating in cooperative transmission; and determining whether the corresponding terminal has participated in cooperative transmission, on the basis of the comparison result.

2 Claims, 15 Drawing Sheets

FIG. 2
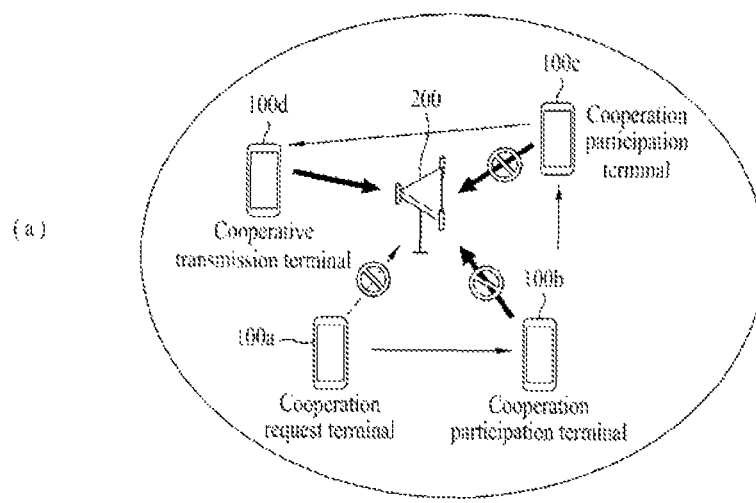
(a)
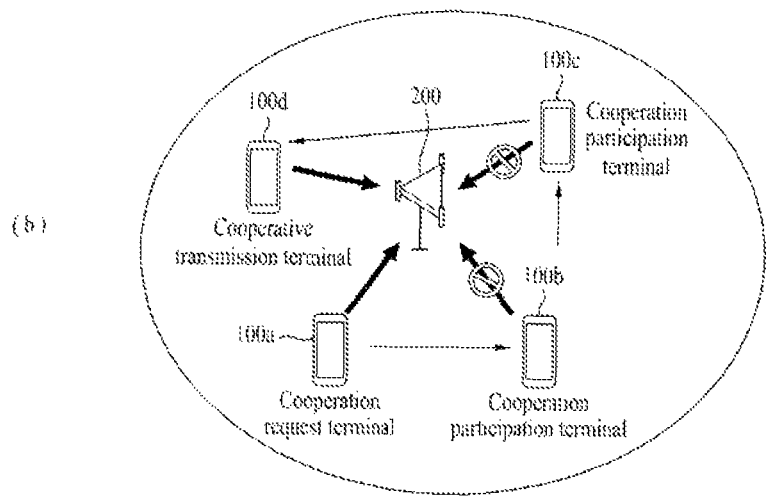
(b)

METHOD OF COOPERATIVE DATA TRANSMISSION BETWEEN TERMINALS AND A METHOD OF RECEIVING DATA

CROSS-REFERENCE TO RELATED APPLICATIONS

This application is the National Stage filing under 35 U.S.C. 371 of International Application No. PCT/KR2011/002755, filed on Apr. 18, 2011, which claims the benefit of U.S. Provisional Application Ser. No. 61/325,352, filed on Apr. 18, 2010, U.S. Provisional Application Ser. No. 61/325,385, filed on Apr. 19, 2010, and U.S. Provisional Application Ser. No. 61/333,236, filed on May 10, 2010, the contents of which are all hereby incorporated by reference herein in their entirety.

TECHNICAL FIELD

The present invention relates to cooperative communication.

BACKGROUND ART

MIMO is an abbreviation of Multi-Input Multi-Output, and refers to a method of improving efficiency of data transmission and reception by adopting multiple transmit antennas and multiple receive antennas instead of using one transmit antenna and one receive antenna. That is, MIMI is a technology for enhancing capacity or improving performance using multiple antennas at the transmission end or reception end of a wireless communication system. Here, MIMO is also called multiple antennas.

In summary, multiple antenna technology applies collection of data fragments received from several antennas and completion of a message in order to receive one whole message without relying on a single antenna path. This is a next generation mobile communication technology which can be broadly applied to a mobile communication terminal and a relay, etc. because data transmission speed may be improved in a certain range and a system range may be increased with respect to specific data transmission speed. As such, this technology has drawn attention of those skilled in the art as a next generation technology capable of overcoming limitations of the amount of the transmission data of a mobile communication which has reached a limited situation due to extension of data communication.

Generally, when a transmission channel is in a deep fading state, if another version or replica of a transmission signal is not additionally transmitted, it is very difficult for a receiver to determine a transmitted signal. The source corresponding to the above mentioned other version or replica is called diversity, and this is a very important factor which contributes to performance of reliable transmission with respect to the wireless channel.

The use of diversity may maximize transfer capacity or transfer reliability. A system, which performs diversity using multiple transmit antennas and multiple receiving antennas, is also called a MIMO system or a multiple antenna system.

Likewise, in order to overcome performance deterioration by channel padding, a spatial diversity scheme using a MIMO system has been studied a lot.

A MIMO system provides advantages such as high data transfer rate, low error rate, and channel capacity enhancement, etc. by implementing two or more antennas to a transmitter and a receiver.

However, despite advantages of the MIMO system, it is generally impossible to implement a MIMO system in uplink due to restrictions on size, weight, hardware complexity, etc.

As an alternative, a cooperative diversity scheme has been suggested. The cooperative diversity scheme has advantages such as spatial diversity gain of a MIMO system, error rate reduction, channel capacity enhancement, etc. even when each terminal has only at least one antenna in a wireless communication network. To this end, the cooperative diversity scheme makes it possible to have advantages of a MIMO system using only one or more antennas by forming a virtual MIMO system as neighboring terminals share resources such as a frequency band with the antenna of a relay with a relay and a femtocell.

Likewise, the cooperative diversity scheme is based on use of a separate relay.

However, there is a need for cooperative transmission using terminals without a separate relay.

DISCLOSURE

Technical Problem

An object of the present invention devised to solve the problem lies in a method for making cooperative transmission possible, specifically a method for searching for a terminal requesting cooperative transmission and a terminal capable of responding to such a request.

Another object of the present invention devised to solve the problem lies in a method for efficiently allocating resources according to each transmission type when performing cooperative transmission.

Another object of the present invention devised to solve the problem lies in a method for reducing power consumption of a cooperative transmission terminal when performing cooperative transmission between terminals.

Technical Solution

The object of the present invention can be achieved by providing a method for reducing power consumption for cooperative transmission performance in a cooperative transmission system, the method including adjusting a participation rate of at least one cooperative transmission capable terminal within at least one cooperative cluster by defining a cooperative transmission participation rate or a cooperative transmission non-participation rate, wherein the adjusting includes generating a random value having a preset range in the at least one cooperative transmission capable terminal, comparing the generated random value with a threshold which becomes a criterion for determining whether to participate in cooperative transmission, and determining whether to participate in the cooperative transmission based on a result of the comparison.

Here, the preset range is between 0 and 1 or between 0 and 100.

Further, if the generated random value is larger than the threshold, the terminal participates in the cooperative transmission.

Further, the method further includes receiving data from a cooperative transmission requesting terminal, and transmitting the received data to a base station.

Further, in the case in which the data having been transmitted to the base station is retransmitted, the determined status on participation in the cooperative transmission is not changed.

Further, the threshold is a value transmitted from a base station, or a preset value.

In another aspect of the present invention, provided herein is a method for reducing power consumption for cooperative transmission performance in a cooperative transmission system, the method including receiving cooperative participation information including at least one of a number of times of participation in cooperative transmission and a period of participation in cooperative transmission from at least one cooperative transmission capable terminal, calculating a weight based on the received cooperative participation information, comparing the calculated weight with a threshold which becomes a criterion for determining whether to participate in the cooperative transmission, and determining terminals which will participate in the cooperative transmission.

Here, the terminals, which will participate in the cooperative transmission, are determined by multiplying the calculated weight by a data transmission rate and/or an amount of data transmitted.

Further, the terminals, which will participate in the cooperative transmission, are determined by applying the calculated weight along with a weight for scheduling.

In another aspect of the present invention, provided herein is a terminal for reducing power consumption for cooperative transmission performance in a cooperative transmission system, the terminal including a wireless communication unit for transmitting and receiving a wireless signal with an outside, and a controller which is connected to the wireless communication unit, wherein the controller controls to generate a random value having a preset range, compare the generated random value with a threshold, which becomes a criterion for determining whether to participate in cooperative transmission, and determine whether to participate in the cooperative transmission based on a result of the comparison.

Here, if the generated random value is larger than the threshold, the terminal participates in the cooperative transmission.

Further, the controller controls the wireless communication unit to receive data from a cooperative transmission requesting terminal and to transmit the received data to a base station.

Further, in the case in which the data having been transmitted to the base station is retransmitted, the determined status on participation in the cooperative transmission is not changed.

Further, the threshold is a value transmitted from a base station, or a preset value.

Advantageous Effects

According to the present invention, when the channel situation of a terminal is poor and resources for transmitting data are not sufficiently allocated, the success rate of data transmission may be increased by performing cooperative transmission with the help of another terminal.

Further, according to the present invention, efficient cooperative transmission may be performed by providing a method for searching for terminals having direct cooperative relation between the terminals or through a base station.

Further, according to the present invention, power consumption of terminals participating in cooperative transmission may be reduced by adjusting the participation rate of terminals participating in cooperative transmission within a cooperative cluster through stipulating participation rate of cooperative transmission and giving weight to terminals participating in cooperative transmission.

DESCRIPTION OF DRAWINGS

FIG. 2 illustrates another concept of cooperative transmission.

BEST MODE

Figure 1:
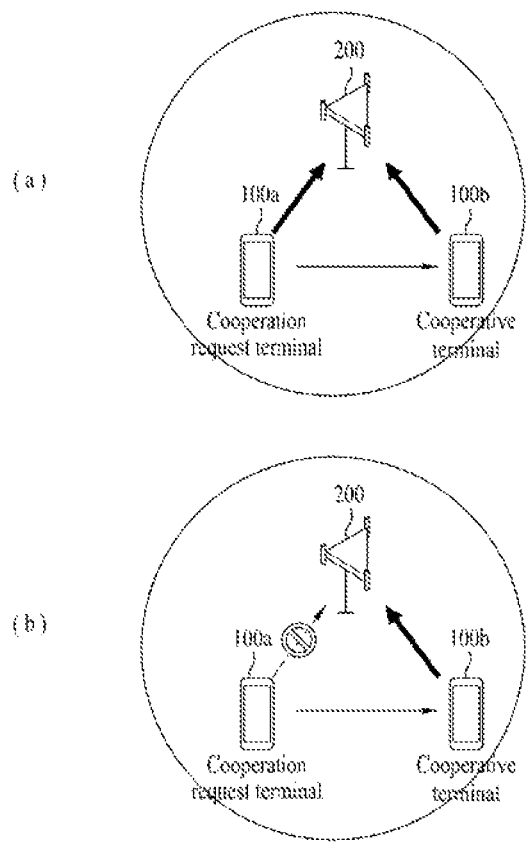
FIG. 1 illustrates a concept of cooperative transmission.

The present invention is applied to cooperative diversity. However, the present invention is not limited thereto, and may be applied to all communication systems and methods to which the technical concept of the present invention can be applied, and other systems.

It should be noted that technological terms used herein are merely used to describe a specific embodiment, but not to limit the present invention. Also, unless particularly defined otherwise, technological terms used herein should be construed as a meaning that is generally understood by those having ordinary skill in the art to which the invention pertains, and should not be construed too broadly or too narrowly. Furthermore, if terms used herein are wrong terms unable to correctly express the spirit of the invention, they should be replaced by terms that are properly understood by those skilled in the art. In addition, general terms used in this invention should be construed based on dictionary definition, or context, and should not be construed too broadly or too narrowly.

Incidentally, unless clearly used otherwise, singular expressions include a plural meaning. In this application, the terms "comprising" and "including" should not be construed as necessarily including all of the elements or steps disclosed herein, and should be construed not to include some of the elements or steps thereof, or should be construed to further include additional elements or steps.

Terms used herein including an ordinal number such as first, second, etc. can be used to describe various elements, but the elements should not be limited by those terms. The terms are used merely to distinguish one element from another. For example, a first element may be named as a second element, and similarly, a second element may be named as a first element.

Where an element is "connected" or "linked" to the other element, it may be directly connected or linked to the other element, but another element may be present therebetween. On the contrary, in case where an element is "directly connected" or "directly linked" to another element, it should be understood that any other element is not existed therebetween.

Hereinafter, preferred embodiments of the present invention will be described in detail with reference to the accompanying drawings, and the same or similar elements are designated by the same numeral references regardless of the numerals in the drawings and the redundant description will be omitted. In the present invention, moreover, a detailed description will be omitted when a specific description of publicly known technologies to which the invention pertains is judged to obscure the gist of the present invention. Also, it should be noted that the accompanying drawings are merely illustrated to easily explain the spirit of the invention, and therefore, they should not be construed as limiting the spirit of the invention by the accompanying drawings. The spirit of the invention should be construed as extending to all changes, equivalents, and substitutes other than the accompanying drawings.

Hereinafter, the terminal may also be called a user equipment (UE), a mobile station (MS), a user terminal (UT), a subscriber station (SS), a wireless device, a handheld device, and an access terminal (AT). Further, the terminal may be a portable device having a communication function such as a mobile phone, a PDA, a smartphone, a wireless modem, a notebook computer, etc., or a non-portable device such as a desktop PC and a device mounted on an automobile.

FIG. 1 illustrates a concept of cooperative transmission.

Referring to FIG. 1, there are a base station 200 and terminals. Here, for example, when channel state is poor and resources are not sufficiently allocated, a terminal 100a may request cooperation with another terminal 100b, and in response to the request, the other terminal 100b may transmit data of the terminal 100a to the base station 200.

Here, as shown in FIG. 1, the terminal requesting cooperation is referred to as a cooperation requesting terminal and the terminal responding to the cooperation request is referred to as a cooperating terminal.

The cooperation requesting terminal may also be called a main cooperating terminal. The cooperating terminal may also be called a cooperative transmission terminal or a cooperating terminal.

Further, referring to FIG. 1, there is one cooperating terminal 100b which transmits data of the terminal 100a in response to the cooperation request. Likewise, if the number of cooperating terminals 100b is limited to one, processing delay is reduced and implementation becomes easy, but since the number of terminals is small, a combining gain becomes small and a link between another cooperating terminal 100b and the base station or the channel state may become poor, and thus the success rate of transmission may be relatively low.

Referring to FIG. 1(a), a terminal 100a requesting cooperation transmits data to the other terminal 100b, and transmits the data to the base station 200, too. Further, if the other terminal 100b transmits the data to the base station 200, the base station may additionally obtain a combining gain.

In contrast, referring to FIG. 1(b), if a terminal 100a requesting cooperation transmits data to the other terminal 100b, the data is not transmitted to the base station 200.

FIG. 2 illustrates another concept of cooperative transmission.

Referring to FIG. 2, there are a base station and several terminals 100a, 100b, 100c and 100d. Here, in a situation in which the channel situation is poor and resources are not sufficiently allocated, a terminal 100a may request cooperation of another terminal 100b, the other terminal 100b requests cooperation to further another terminal 100c, and the further another terminal 100c may also request cooperation to further another terminal 100d.

Likewise, only one of the several terminals 100b, 100c and 100d may respond to the cooperation request and transmit data of the terminal 100a to the base station.

Here, as illustrated in FIG. 2, the terminal requesting cooperation is referred to as a cooperation requesting terminal, terminals 100b, 100c and 100d participating in cooperation are referred to as cooperation participation terminals, and a terminal, which participates in cooperation and actually transmits data, is referred to as a cooperative transmission terminal 100d.

The cooperation requesting terminal may also be called a main cooperating terminal. The cooperating terminal may also be called a cooperative transmission terminal or a cooperating terminal.

Further, referring to FIG. 2(a), the number of terminals, which actually transmit data of the terminal 100a to the base station 200 among several cooperative participation terminals 100b, 100c and 100d having responded to the cooperation request, is one. Here, the cooperation requesting terminal 100a does not transmit data to the base station 200.

Likewise, a method of allowing only one of several cooperative participation terminals 100b, 100c and 100d having responded to the cooperation request to transmit data of the cooperation requesting terminal 100a to the base station has an advantage in that successful transmission is guaranteed by selecting a terminal whose channel quality or link with the base station 100 is best and transmitting data through the terminal. However, there is also a disadvantage in that, since the data needs to consecutively pass through multiple cooperative participation terminals 100b, 100c and 100d, there may be a delay. Further, the number of terminals, which actually transmit data of the terminal 100a to the base station 200, is only one, and thus combining gain, which can be additionally obtained, is small.

Further, referring to FIG. 2(b), the cooperation requesting terminal 10 transmits its own data to the base station 200, and the cooperative transmission terminal 100d also transmits data of the cooperation requesting terminal 100a to the base station 200.

Figure 3:
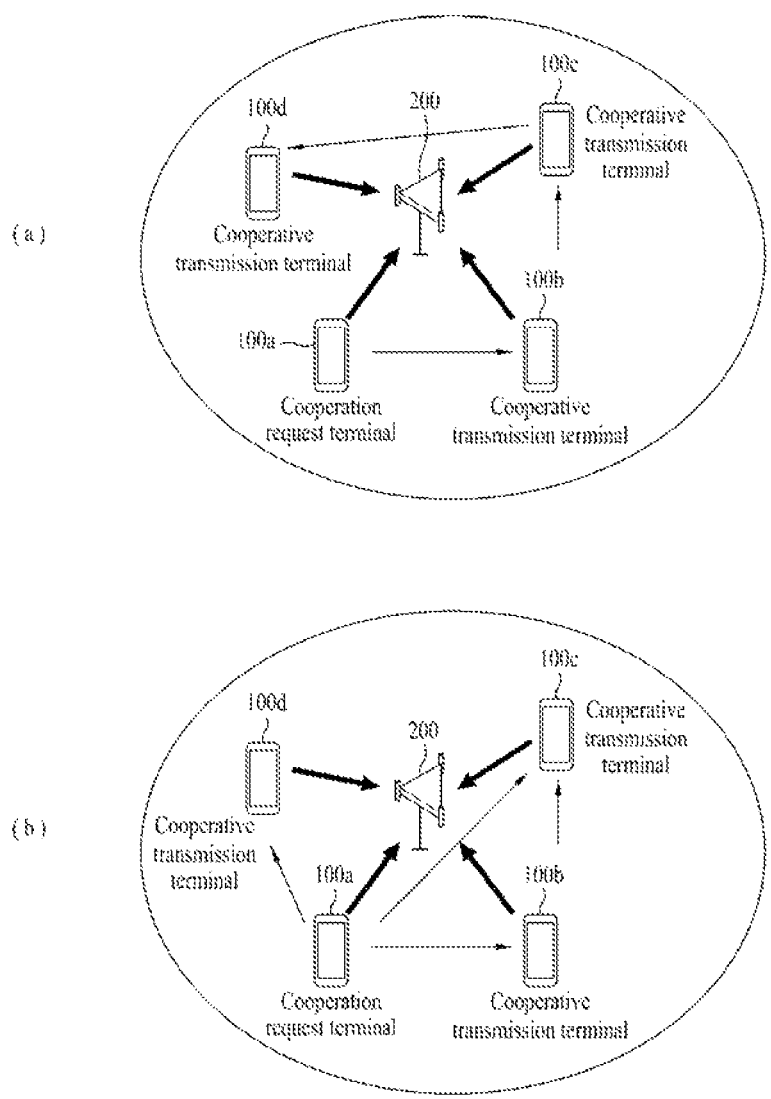
FIG. 3 illustrates further another concept of cooperative transmission.

FIG. 3 illustrates another concept of cooperative transmission.

Referring to FIG. 3(a), there are a base station and several terminals 100a, 100b, 100c and 100d. Here, when the channel situation is poor and resources are not sufficiently allocated, a terminal 100a may request cooperation of another terminal 100b, the other terminal 100b requests cooperation of further another terminal 100c, and the further another terminal 100c may also request cooperation of further another terminal 100d.

Likewise, one or more of the several terminals 100*b*, 100*c* and 100*d* may respond to the cooperation request and transmit data of the terminal 100*a* to the base station.

Here, referring to FIG. 3(*a*), all of the several terminals 100*b*, 100*c* and 100*d* respond to the request and transmit data of the terminal 100*a* to the base station 100*a*. Hence, in FIG. 3(*a*), the several terminals 100*b*, 100*c* and 100*d* are referred to as cooperative transmission terminals.

Further, referring to FIG. 3(*b*), for example, when the channel state is poor and resources are not sufficiently allocated, the cooperation requesting terminal 100*a* may request cooperation of different terminals 100*b*, 100*c* and 100*d*, respectively.

Likewise, a plurality of terminals among terminals 100*b*, 100*c* and 100*d* may respond to the cooperation request and transmit data of the terminal 100*a* to the base station.

Likewise, the method of allowing multiple terminals to transmit data of the terminal 100*a* to the base station has an advantage in that the success rate may be significantly increased, but implementation is difficult and a delay on cooperative transmission may occur.

According to the above description with reference to FIGS. 1 to 3, the main body, which receives control information on cooperative transmission, and the content of the uplink resource allocation message, become different according to each cooperative transmission method. Here, the link between a terminal and a base station and the link between terminals need to be separately considered for the resource allocation request and resource allocation. That is, there may be an uplink resource allocation request which a terminal requests to the base station, and a resource allocation request which a terminal requests to another terminal. In the case of resource allocation, there may also be uplink resource allocation transmitted by the base station to the terminal, and a resource allocation transmitted by a terminal to another terminal.

Figure 4:
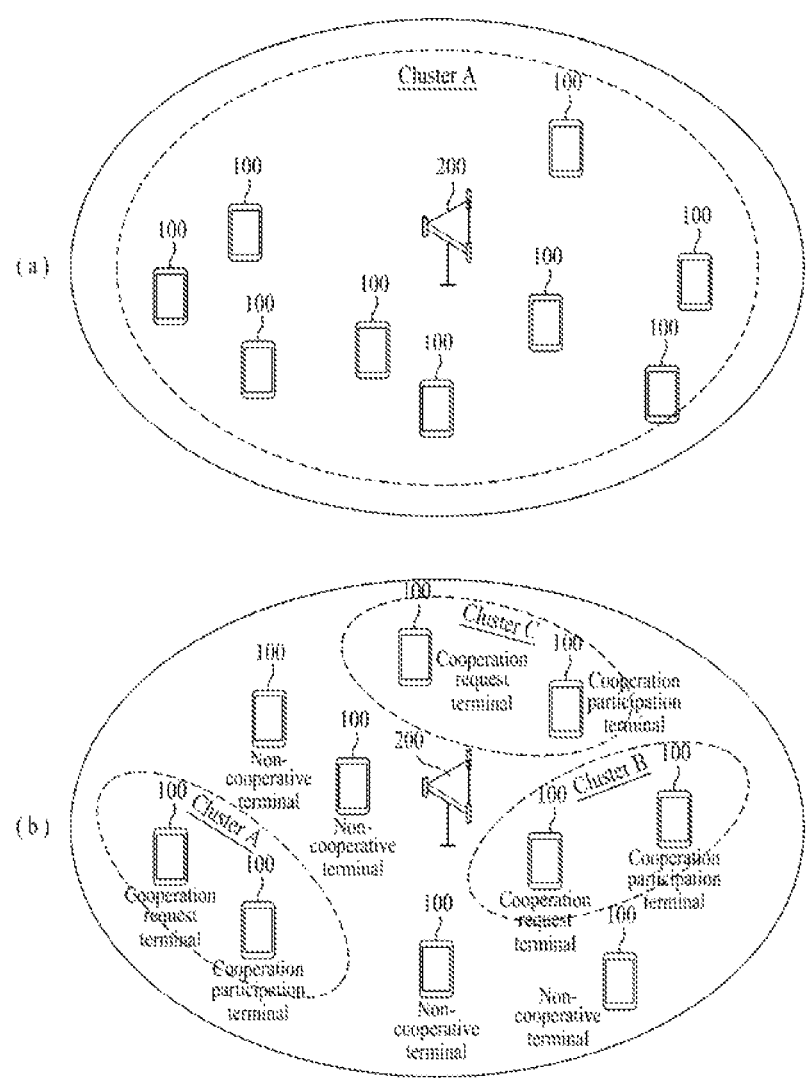
FIG. 4 illustrates a concept of a cooperative cluster of terminals.

FIG. 4 illustrates a concept of a cooperative cluster of terminals.

Terminals may be classified into a non-cooperating terminal, a cooperation-capable terminal, a cooperative transmission terminal, a cooperation requesting terminal, etc. according to the operation and the role. The non-cooperating terminal may also be called a single transmission terminal. Further, the cooperation-capable terminal may also be called a cooperating terminal candidate. The cooperation requesting terminal may also be called a main cooperating terminal. The cooperative transmission terminal may also be called a cooperating terminal or a cooperating terminal.

As described above, the cooperative participation terminal refers to a terminal which participates in cooperative transmission and does not transmit data to the base station. Here, the terminal, which has accepted the cooperation request, may be called a cooperation acceptance terminal. The cooperation acceptance terminal includes both the cooperative transmission terminal (or cooperating terminal) and the cooperative participation terminal.

The cooperation-capable terminals may be grouped into a virtual group called a cooperative cluster as shown in FIG. 4.

Specifically, as shown in FIG. 4(*a*), the cooperative cluster may include all cooperation-capable terminals, or as shown in FIG. 4(*b*), the cooperative cluster may include cooperation-capable terminals based on geographical information.

If a terminal enters a base station (called network entry), the cooperative cluster may be generated by the base station, and the cooperative cluster may also be generated by forming a direct cooperative relation between terminals.

If the cooperative cluster is generated in the base station, information on the cooperative cluster may be periodically broadcast by the base station. Further, the information may be unicast when requested by the terminal.

If terminals form their own cooperative cluster, information on the cooperative cluster may be unicast or multicast by the terminals or an arbitrary terminal.

Further, FIG. 4 illustrates that a cooperative cluster is generated only for terminals which belong to the cell of one base station in cooperative transmission. However, it is possible for the cooperative cluster to be generated for terminals which belong to different base stations. Likewise, multiple base stations, which make the cooperative cluster possible, may also be called cooperative base stations or cooperative (e)NodeBs.

Further, up to now, a concept of a cooperative cluster for allowing terminals to perform cooperative transmission of data has been described. Hereinafter, necessary matters for allowing terminals to perform cooperative transmission of data will be described.

Additional Matters for Cooperative Transmission of Terminals

Additional points, which need to be additionally defined to support cooperative transmission of terminals, may be briefly described as follows.

1. All terminals support cooperative transmission.

a) The cooperative transmission-capable terminal may also be operated at cooperative transmission-capable mode or single transmission mode depending on whether the terminal participates in cooperative transmission. That is, cooperative transmission should be possible in all terminals which support a terminal cooperative transmission system, and in the case of satisfying a certain condition, it is possible not to participate in cooperative transmission. In the case of a terminal, which does not participate in cooperative transmission, it is possible to be operated at the above mentioned cooperative transmission possible mode or signal transmission mode.

Here, the certain condition may be conditions for preventing power consumption of the terminal. In order to prevent power consumption of the terminal, a method of adjusting whether the terminal participates in cooperative transmission will be specifically described below.

For example, terminals that satisfy the conditions such as 1) a terminal which satisfies an initial condition (critical value or weight condition) about terminal cooperative transmission participation, 2) a terminal which has accepted a terminal cooperative transmission request, 3) a terminal which has been set by the base station to participate in cooperative transmission, etc., actually participate in cooperative transmission, and terminals that do not satisfy such conditions are set to be operated in single transmission mode.

b) The state of a cooperative transmission capable terminal is switched to a cooperative transmission capable state in the case in which its own data is not transmitted.

c) The cooperative transmission capable terminal or cooperation requesting terminal may use a frame structure in a form which is different from that of a single transmission mode for making cooperative transmission possible or for transmission and exchange of data for cooperative transmission.

For example, a relay zone may be used as a resource for message exchange of a cooperative transmission capable, request, acceptance, etc. of cooperative transmission of terminals, and/or as a resource for transmission and reception of data between terminals. For example, AAI DL Relay Zone and/or AAI UL Relay Zone of IEEE 802.16m may be used in exchanging messages and data between terminals.

2. A cooperative transmission capable terminal has a paging interval which is different from a single transmission terminal for low power consumption.

a) One sleep cycle (or sleep duration) extension is not applied.

b) The cooperative transmission capable terminal has a short paging unavailable interval or a long paging listening interval compared to a single transmission terminal for cooperative transmission in an idle mode.

3. In a cooperative transmission capable terminal, the extension of a sleep cycle for low power consumption is not applied.

a) A cooperative transmission capable terminal is set to have a short sleep cycle compared to a single transmission terminal in sleep mode for cooperative transmission.

b) A cooperative transmission capable terminal is set to have a short sleep window or a long listening window compared to a single transmission terminal.

c) In order to reduce power consumption of a single transmission terminal, when there is no received data, a method of extending the sleep window of the sleep cycle is used, and such an extension is not allowed for a cooperative transmission capable terminal.

d) When a base station recognizes that the terminal is a cooperative transmission capable terminal, an indicator, which gives information on transmission traffic, may not be transmitted. For example, by not sending a negative indication to a traffic indication message or by sending to the listening window an indicator which gives information that the terminal is a cooperative transmission terminal, entrance to slip mode may be prevented.

Hereinafter, a search method about how terminals find each other before terminals perform cooperative transmission of data will be specifically described.

First, in order for one or more terminals to have a cooperative relation, terminals should be able to know cooperation capable terminal information based on which terminals may be able to have cooperative relation. Here, methods of locating cooperative transmission capable terminals may be divided into a passive mode and an active mode depending on whether the terminals are notified by the base station or the terminals are found by the terminals themselves.

I. Passive Mode

Manual mode refers to a method of searching for cooperative transmission capable terminals by a base station.

That is, a base station finds cooperative transmission possible terminals using information such as location information of each terminal, receiving power on a terminal, cooperative transmission rate of a terminal, etc.

1) The base station compares receiving power on each terminal with a specific threshold, and periodically writes and updates a list of terminals having neighboring high reception SINRs for terminals having low reception power as a result of the comparison.

For example, a base station writes a cooperating terminal candidate list and a cooperative cluster list, and transmits the list to the terminal.

Here, the threshold is a criterion value for determining terminals which need cooperative transmission, and may be a predefined value or a value determined by the base station.

If a location-based service (LBS) is possible, the cooperating terminal candidate list may be written for terminals which can perform cooperative transmission around a terminal for the terminal having a low SINR based on the location information.

Further, the base station may give a unique temporary MS ID within the cluster to cooperating terminal candidates within the cluster.

2) In the case in which it is determined that cooperative transmission is necessary for the terminals, the base station forms a cooperative transmission relation between the terminals with reference to the cooperating terminal candidate list, and allocates resources.

Grant information transmitted by a base station may include at least one of MS ID of a cooperative transmission terminal, MS ID of a cooperative transmission capable terminal, cooperative cluster ID for terminals having cooperative transmission relation, and temporary ID.

The cooperative cluster ID may be configured using part or all MS IDs of terminals included in the cooperative cluster.

Further, the cooperative cluster ID is composed of values arbitrarily determined in the base station. For example, the cooperative cluster ID may be composed of a random value or an index value according to the order of cooperative cluster formation.

3) A terminal may perform cooperative transmission with a terminal of a neighboring base station. That is, a terminal of a neighboring base station may be searched for.

That is, the base station may exchange a cooperating terminal candidate list with a neighboring base station, and the terminal may directly receive the cooperating terminal candidate list from the neighboring base station.

Figure 5:
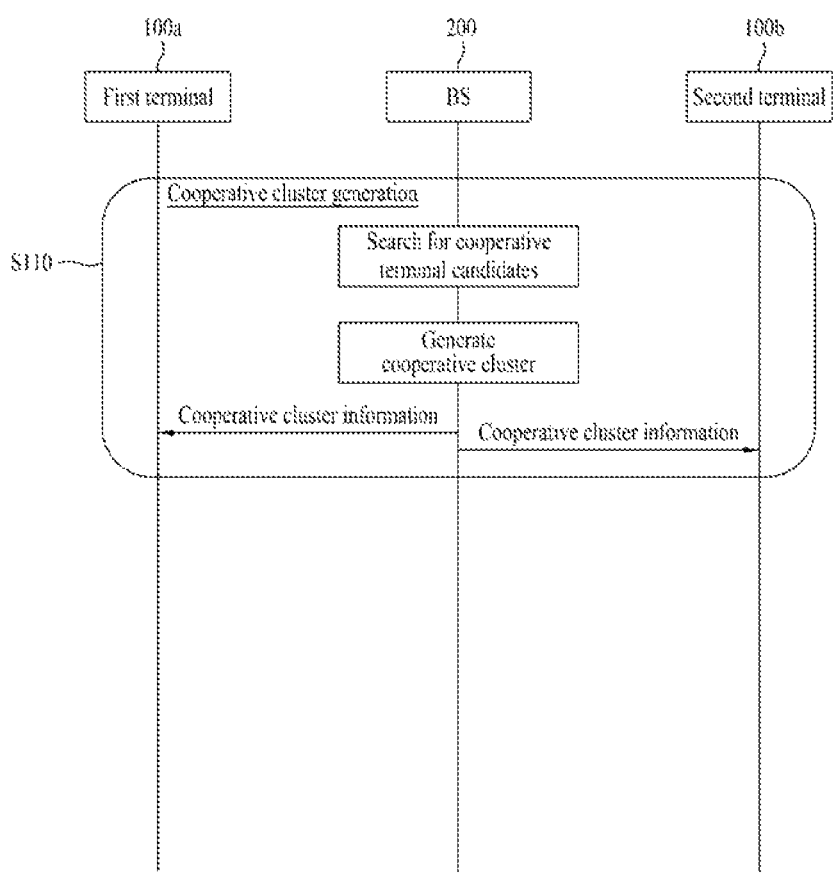
FIG. 5 illustrates a method for searching for a terminal capable of cooperative transmission in a manual manner.

FIG. 5 illustrates a method for searching for cooperating terminal candidates (cooperative transmission capable terminals) according to a manual method.

Referring to FIG. 5, first, terminals may search for cooperating terminal candidates based on cooperative cluster information generated through a cooperative cluster generation process (S110).

The process of generating the cooperative cluster (S110) will be described below.

The base station 200 finds (or selects) cooperating terminal candidates based on the location information of each terminal, reception power of each terminal, cooperative transmission rate of terminals, etc.

Thereafter, the base station generates a cooperative cluster for selected cooperating terminal candidates (or a cooperating terminal candidate list), and informs a first terminal 100a and a second terminal 100b of information on the generated cooperative cluster.

A process of generating the cooperative cluster (S110) will be more specifically described below.

The base station 200 generates a cooperative cluster including the first terminal 100a and the second terminal 100b, and transmits information on the generated cooperative cluster to the two terminals 100a and 100b. The base station 200 may generate a cooperative cluster including the first terminal 100a and the second terminal 100b using information such as terminal subscriber information, the channel quality indicator (CQI) receivable from the terminal, SINR, etc.

After generating the cooperative cluster, the base station 200 may assign an ID to the generated cooperative cluster, and transmit the cluster ID information. Further, regardless of the MSIC (or STID) of each terminal, the base station 200 may assign an MS temporary ID which may distinguish terminals within each cluster while protecting information of each terminal, include the ID in the cooperative cluster information and transmit the information to each terminal.

Likewise, the base station may transmit the cooperative cluster information to each terminal periodically or when an event occurs, the cooperative cluster information including basic information for cooperative transmission such as the ID of the cooperative transmission cluster, MS temporary ID, etc.

Up to now, a manual method of finding cooperating terminal candidates and providing information thereon has been described. Hereinafter, an active mode of directly finding cooperating terminal candidates by the terminals themselves will be described.

II. Active Mode

An active mode is a method of finding cooperating terminal candidates in a way that a terminal shows a desire for cooperative participation. Here, the active mode may be classified into two types, i.e., case 1 and case 2, depending on whether information on cooperating terminal candidates is transmitted to the terminal through the base station, or the transmission of the information is performed directly between terminals.

That is, case 1 is a case in which information on cooperating terminal candidates is transmitted to the terminal through the base station, and case 2 is a case in which information on cooperating terminal candidates is directly exchanged between terminals.

(a) Case 1

A terminal transmits information on an intention to participate in cooperative transmission to the base station. Here, the information on the intention to participate may include at least one of a cooperative transmission capable message, part or the whole of MS ID, temporary MS ID, etc.

Further, the temporary MS ID is generated by the terminal, and may be a random value or a sequence.

Further, the cooperative transmission capable message is a 1 bit cooperation indicator.

Thereafter, the base station generates a cooperating terminal candidate list based on the information transmitted by the terminal. That is, the base station establishes a cooperative cluster. Here, when a location-based service (LBS) is available, the base station may intellectually constitute a list of cooperating terminal candidates around each terminal.

Further, the base station may periodically transmit the cooperating terminal candidate list including cell IDs to a neighboring base station in order for a home terminal to support cooperative transmission with terminals of the neighboring base station.

Further, the base station may periodically broadcast the cooperating terminal candidate list to the terminals, or multicast the list to terminals having a low receiving SINR.

Further, when an event occurs, the event such as a request of a terminal in which retransmission is required by more than a certain number of times, or a certain terminal, etc., the cooperating terminal candidate list for the terminal may be unicast.

Further, when LBS is possible, the cooperating terminal candidate list is unicast to a terminal requiring cooperative transmission.

Thereafter, the cooperation requesting terminal transmits a cooperative transmission request message to cooperating terminal candidates with reference to the cooperating terminal candidate list received from the base station.

Here, the cooperative transmission request message transmitted by a terminal to a terminal may include at least one of a cooperation request indicator, part or the whole of the MS ID of the transmission terminal, part or the whole of the MS ID of the reception terminal, the temporary MS ID of the transmission terminal, and the temporary MS ID of the reception terminal.

Thereafter, terminals, which receive a cooperative transmission request message (cooperation request message), transmit a cooperative transmission acceptance message (cooperation acceptance message).

Here, the cooperation acceptance message may include at least one of a 1 bit cooperation acceptance indicator, part or the whole of the MS ID of the transmission terminal, the temporary MS ID of the transmission terminal, part or the whole of the MS ID of the request terminal, the temporary MS ID of the request terminal, and the resource allocation message (grant) for the cooperation requesting terminal.

For example, a cooperation request indicator and a cooperation acceptance indicator may comprise 2 bits as shown below.

E.g.,) 0bxx (2 bit)—MSB: Acceptance/Request, LSB: No/Yes

0b00: Cooperation Rejection
0b01: Cooperation Acceptance
0b10: Cooperation Request
0b11: reserved Here, all terminals, which have received the cooperation request message, may transmit a message on cooperation acceptance/rejection. Further, only terminals, which accept cooperation, may transmit an acceptance message.

Further, in the case in which there is no grant information on a cooperation requesting terminal in the cooperation acceptance message, the cooperation requesting terminal requests resource allocation of the cooperation acceptance terminal.

The resource allocation request message may include at least one of part or the whole of the MS ID of the transmission terminal, the temporary MS ID of the transmission terminal, part or the whole of the MS ID of the request terminal, and the temporary MS ID of the request terminal.

Thereafter, the terminal transmits data to a terminal which has transmitted a cooperation acceptance message.

Case 1 will be more specifically described below with reference to FIG. 6.

Figure 6:
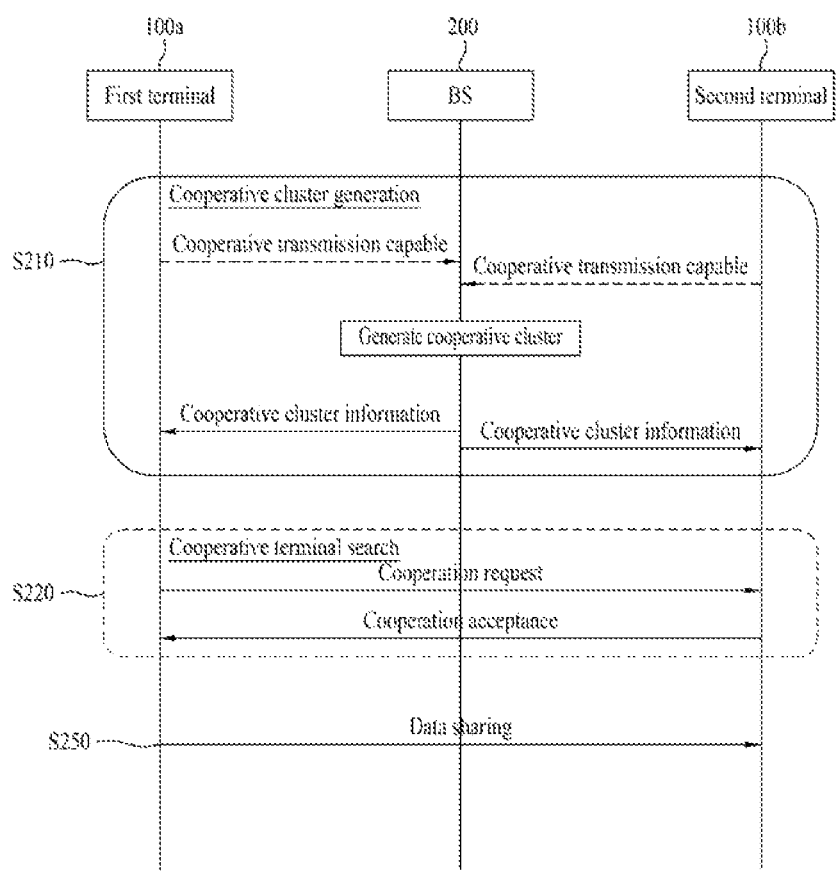
FIG. 6 illustrates a method for transmitting information on terminals capable of cooperative transmission to a terminal through a base station among active methods.

FIG. 6 illustrates a method of transmitting information on cooperating terminal candidates to a terminal through a base station among active modes.

Referring to FIG. 6, cooperating terminal candidates may be searched through a cooperative cluster generation process (S210), and terminals, which will actually cooperate, are searched through a cooperating terminal search process (S220).

First, explaining the cooperative cluster generation process (S210), the first terminal 100*a* and the second terminal 100*b* transmit a cooperative transmission capable message (or signal or indicator), which indicates that cooperative transmission is possible, to each base station 200. That is, the base station receives information indicating that cooperative transmission is possible, from the first terminal and the second terminal.

At this time, in the case in which the base station 200 knows that the two terminals 100*a* and 100*b* are cooperating terminals based on subscriber information, etc. of the two terminals 100*a* and 100*b*, the two terminals 100*a* and 100*b* may not transmit the cooperative transmission capable message or signal.

The base station 200 generates a cooperative cluster including the first terminal 100*a* and the second terminal 100*b*, and transmits information on the generated cooperative cluster to the two terminals 100*a* and 100*b*.

After generating the cooperative cluster, the base station 200 may assign an ID for the generated cooperative cluster, and transmit the cluster ID information. Further, regardless of the MSID (or STID) of each terminal, the base station 200 may assign the MS temporary ID which may distinguish the terminals within each cluster while protecting information of each terminal, and include the ID in the cooperative cluster information and transmit the information to each terminal.

Likewise, the base station may transmit the cooperative cluster information to each terminal periodically or when an event occurs, the cooperative cluster information including basic information for cooperative transmission such as the ID of the cooperative transmission cluster, the MS temporary ID, etc.

Thereafter, explaining the cooperating terminal search process (S220), the first terminal 100a transmits a cooperation request message to cooperating terminal candidates which belong to the cooperative cluster based on the cooperative cluster information. The second terminal 100b transmits a cooperation acceptance message to the first terminal 100a for the cooperation request message. The terminal, which has accepted the cooperation request, may also be called a cooperative participation terminal as described above.

Here, a resource allocation process (resource allocation request/resource allocation) may be performed through a cooperation request and acceptance message transmission between the first terminal and the second terminal, and the resource allocation process between terminals may be separately performed after a cooperation request and acceptance message transmission process between the first terminal and the second terminal.

That is, in the process of transmitting a cooperation request and acceptance message between terminals, the cooperation request message may include a request for resource allocation, and the cooperation acceptance message may include information on allocated resources.

Further, as an alternative, the cooperation request and acceptation message transmission process between terminals may be included in the process of allocating resources between terminals. That is, a cooperation request may be included in the resource allocation request message in the process of allocating resources between terminals, and the resource allocation message may include the cooperation acceptance.

Further, explaining the resource allocation request process between separate terminals, the first terminal 100a transmits the resource allocation request message to the second terminal 100b, i.e., the cooperative participation terminal in order to request cooperative transmission of data. The second terminal 100b, i.e., the cooperative participation terminal allocates resources to the first terminal, i.e., the cooperation requesting terminal, and transmits information on the allocated resources.

Thereafter, the data sharing process (S250) is performed. That is, if resources are allocated from the second terminal 100b, the first terminal 100a transmits its own data to the second terminal 100b to share the data.

Up to now, case 1 has been described. Hereinafter, case 2 will be described.

(2) Case 2

Case 2 is a method for searching for (or selecting) cooperating terminal candidates directly by the terminals.

Case 2 may be classified into two modes of 1) self PR mode 1 and 2) self PR mode II depending on whether the terminals request cooperation of cooperating terminal candidates or the cooperating terminal candidates inform other terminals of their intention to cooperate.

First, self public relations (PR) mode I will be described below with reference to FIG. 7.

Figure 7:
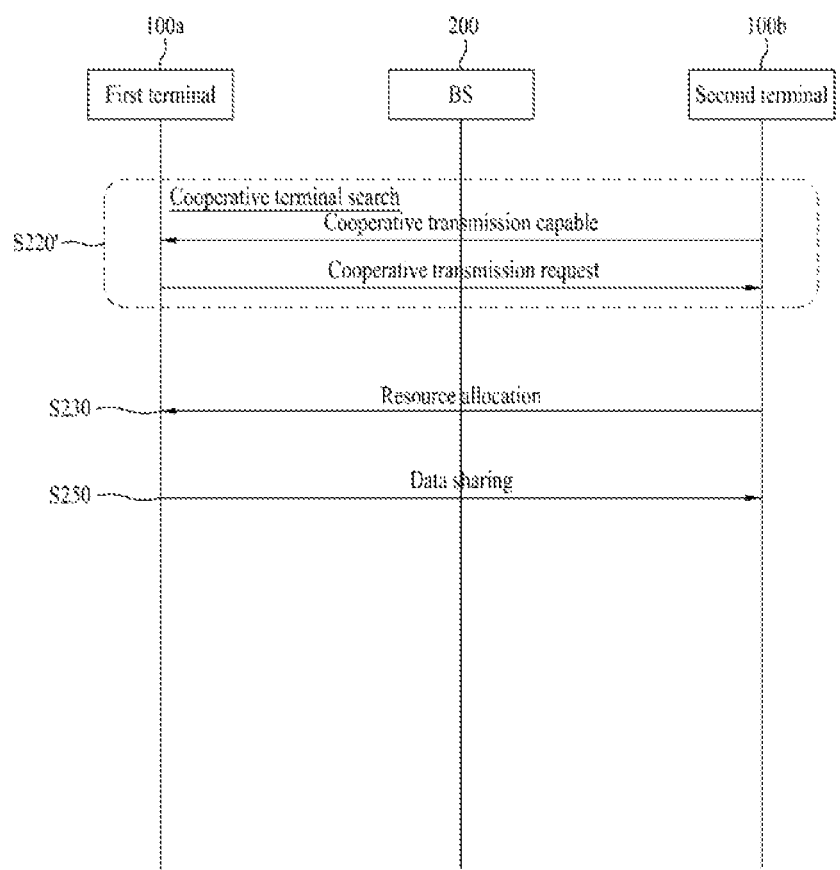
FIG. 7 illustrates a method for searching for a terminal capable of cooperative transmission through self PR mode I among active methods.

FIG. 7 illustrates a method for searching for cooperating terminal candidates through self PR mode I among active methods.

Referring to FIG. 7, unlike FIG. 6, a process (S220') of searching for cooperating terminal candidates between two terminals without a process (S210) of generating a cooperative cluster, is shown.

The search process (S220') will be specifically described below.

The second terminal (a terminal to participate in cooperative transmission) periodically broadcasts a cooperation capable message.

The cooperation capable message may include at least one of a 1 bit cooperation consent indicator, part or the whole of the MS ID, the temporary MS ID, and the cell ID. Further, the temporary MS ID is generated by the terminal, and may be a random value or a sequence. Further, as a method for transmitting the cooperation capable message, a separate broadcasting signal may be transmitted, or part of the downlink common signal of the base station may be utilized.

In the case in which cooperative transmission is required, the first terminal receives the cooperation capable message of the second terminal, and requests cooperative transmission. That is, the first terminal transmits a cooperation request message to the second terminal which has transmitted the cooperation capable message.

The cooperation request message may include at least one of a cooperation request indicator, part or the whole of the MS ID of the request terminal, part or the whole of the MS ID of the reception terminal, the resource allocation request message, the temporary ID of the request terminal, the terminal ID of the request terminal and the cell ID. Here, the temporary ID may be generated by the terminal, and may be a random value or a sequence.

Further, the cooperation request indicator and the cooperation acceptance indicator may be composed of 2 bits as shown below.

Example) 0bxx (2 bit)—MSB: Acceptance/Request, LSB: No/Yes
  0b00: Cooperation Rejection
  0b01: Cooperation Acceptance
  0b10: Cooperation Request
  0b11: reserved The second terminal, which has received the cooperation request message, transmits the resource allocation message to the first terminal which has transmitted the cooperation request message (S230).

Here, the resource allocation message may include at least one of part or the whole of the MS ID of the cooperation requesting terminal, part or the whole of the MS ID of the acceptance terminal, the resource allocation location, modulation and demodulation level, and weight.

Thereafter, the first terminal shares data by transmitting data to the second terminal based on the resource allocation received from the second terminal (S250).

Further, self public relations (PR) mode II will be described below with reference to FIG. 8.

Figure 8:
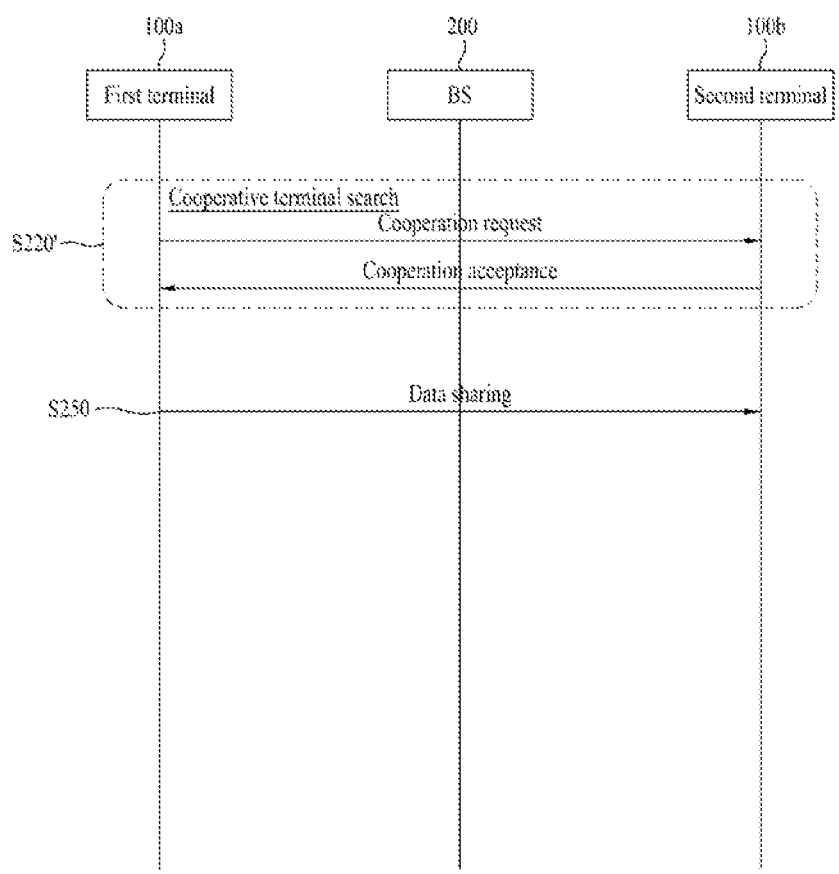
FIG. 8 illustrates a method for searching for a terminal capable of cooperative transmission through self PR mode II among active methods.

FIG. 8 illustrates a method for searching for cooperating terminal candidates through self PR mode II among active methods.

Referring to FIG. 8, unlike FIG. 6, a process (S220") of searching for terminals to actually cooperate between two terminals without a process (S210) of generating a cooperative cluster, is shown. The search process (S220") of FIG. 8 is different from the search process (S220') of FIG. 7 in that the first terminal, which requests cooperation, starts first.

Specifically, explaining the search process (S220"), when cooperative transmission is requested, the first terminal broadcasts a cooperation request message. The cooperation request message may include part or the whole of the MS ID of the terminal, part or the whole of the flow ID, the temporary MS ID, the cooperation request indicator, and the resource allocation request message.

Further, the resource allocation request message may include at least one of part or the whole of the MS ID of the request terminal, and part or the whole of the MS ID of the acceptance terminal.

Here, the temporary MS ID is generated by the terminal, and may be a random value or a sequence.

Further, as a method of transmitting a cooperation request message, a separate uplink broadcast signal may be transmitted, or part of the uplink common signal of the base station may be utilized.

The second terminal to participate in cooperative transmission receives the message and, if cooperative transmission is possible, the second terminal transmits a cooperation acceptance message to the first terminal.

Here, the cooperation acceptance message may include at least one of the cooperation acceptance indicator, part or the whole of the MS ID of the transmission terminal, part or the whole of the MS ID of the request terminal, the temporary MS ID of the transmission terminal, the temporary MS ID of the request terminal, and the resource allocation message (grant) on the cooperation requesting terminal.

Further, if a resource allocation message is transmitted separately from the cooperation acceptance message, the resource allocation message may include at least one of part or the whole of the MS ID of the transmission acceptance terminal, part or the whole of the MS ID of the request terminal, the temporary MS ID of the cooperation acceptance terminal, the temporary MS ID of the request terminal, the resource allocation location, the modulation and demodulation level and the weight.

Here, the cooperation request indicator and the cooperation acceptance indicator may be composed of the following 2 bits.

E.g.) 0bxx (2 bit)—MSB: Acceptance/Request, LSB: No/Yes
  0b00: Cooperation Rejection
  0b01: Cooperation Acceptance
  0b10: Cooperation Request
  0b11: reserved Further, all terminals, which have received the cooperation request message, may transmit a message on acceptance/rejection of cooperation, or only terminals which accept cooperative transmission among the terminal having received the cooperation request message, may transmit a cooperation acceptance message.

Thereafter, the first terminal shares data with the second terminal by transmitting data to the second terminal having transmitted the cooperation acceptance message (S250).

Up to now, the methods of finding cooperating terminal candidates have been described based on two modes, i.e., the passive mode and the active mode. Hereinafter, the method of transmitting data by cooperation among terminals will be described with reference to FIGS. 9 to 12.

Figure 9:
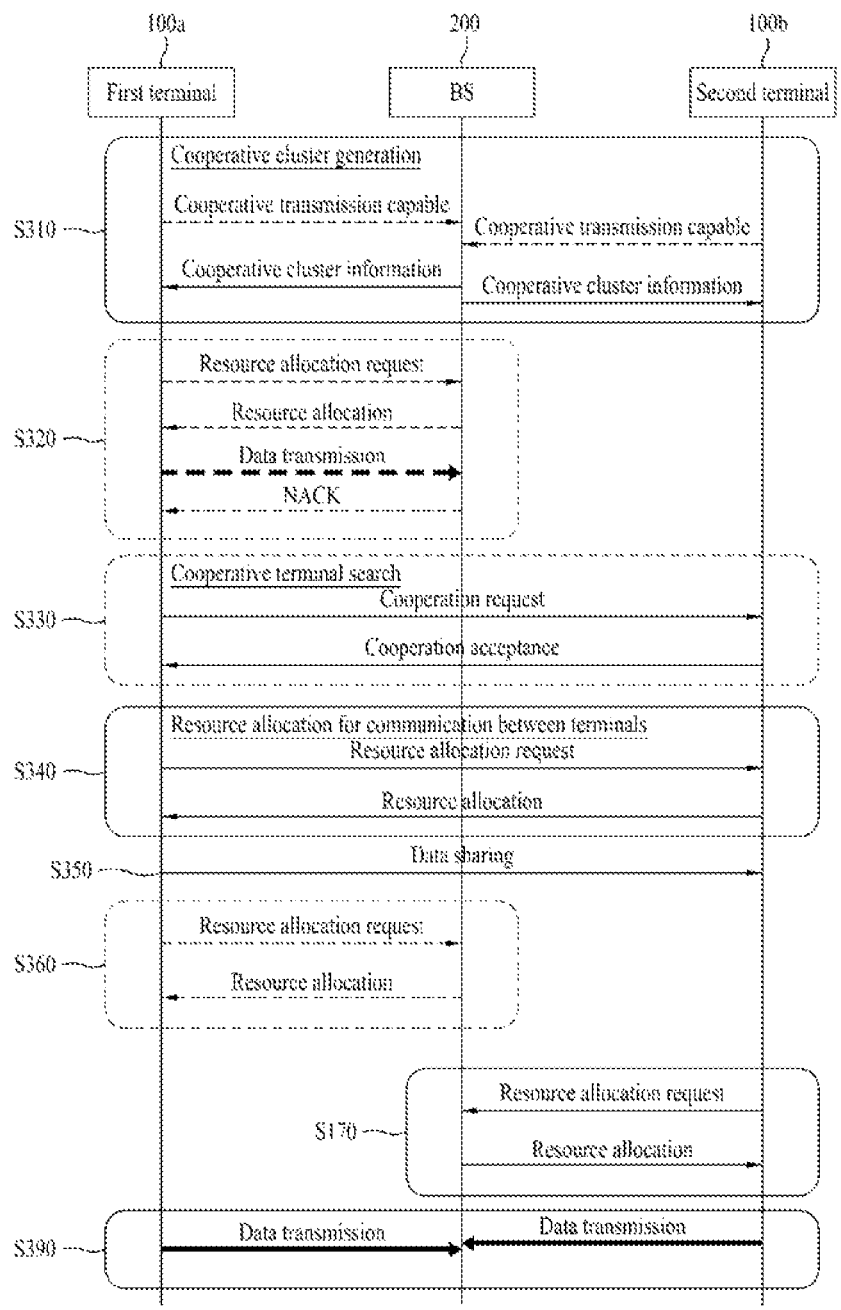
FIG. 9 illustrates a cooperative transmission method by terminals.

First, FIG. 9 illustrates a method for transmitting data by cooperation of terminals.

Referring to FIG. 9, the base station generates a cooperative cluster, and informs the first terminal 100a and the second terminal 100b of information on the cooperative cluster. Further, FIG. 9 illustrates that the decision on whether the first terminal and the second terminal, which belong to the cooperative cluster, will actually cooperate to transmit data, will be performed through the cooperating terminal search procedure (S330). Further, referring to FIG. 9, in the cooperating terminal search procedure (S320), the first terminal 100a is a cooperation requesting terminal which requests cooperation, and the second terminal 100b is a cooperative transmission terminal which transmits data in response to the cooperation request. This procedure will be specifically described below.

First, with respect to the cooperative cluster generation process (S310), the first terminal 100a and the second terminal 100b may transmit the cooperation capable message (or signal or indicator), which indicates that cooperative transmission is possible, to each of the base stations 200. At this time, in the case in which the base station 200 knows that the two terminals 100a and 100b are cooperating terminal candidates (cooperation capable terminals) based on the cooperative cluster information (cluster ID, etc.), MS ID, etc. of the two terminals 100a and 100b, the two terminals 100a and 100b may not transmit the cooperation capable message or signal.

The base station 200 generates a cooperative cluster including the first terminal 100a and the second terminal 100b, and transmits information on the generated cooperative cluster to the two terminals 100a and 100b. Even if the base station 200 has not received the cooperation capable message (or signal or indicator) as stated above, the base station 200 may generate a cooperative cluster including the first terminal 100a and the second terminal 100b using information such as subscriber information of the terminal or channel quality indicator (CQI) or SINR information which may be received from the terminal, etc.

After generating the cooperative cluster, the base station 200 may assign an ID to the generated cooperative cluster, and transmit the cluster ID information. Further, separately from the MSID (or STID) of each terminal, the base station may assign an MS temporary ID for identifying the terminal within each cluster while protecting information of each terminal, and may include the ID in the cooperative cluster information and transmit the information to each terminal.

Likewise, the base station 200 may transmit the cooperative cluster information to each terminal periodically or when an event occurs, the cooperative cluster information including basic information for cooperative transmission, such as the ID of the cooperative transmission cluster, the MS temporary ID, etc.

Thereafter, the first terminal 100a performs the initial data transmission process (S320). Specifically, the first terminal 100a requests the cooperation request message or signal to the base station 200, and if resources are allocated from the base station 200, the first terminal 100a transmits data. In response to the data transmission, the base station 200 may transmit a negative response (e.g., NACK signal or message).

Likewise, in the case in which the initial data transmission process (S320) has been performed but failed, a cooperating terminal search process (S330) may be performed. Alternatively, the cooperating terminal search process (S330) may be performed without the initial data transmission process (S320).

The cooperating terminal search process (S330) may be performed without the initial data transmission process (S320) when channel state is poor or in other situations.

As for the cooperating terminal search process (S330), the first terminal 100a transmits a cooperation request message to cooperating terminal candidates which belong to the cooperative cluster, on the basis of the cooperative cluster information. FIG. 9 illustrates that the second terminal 100b transmits the cooperation acceptance message to the first terminal 100a in response to the cooperation request message. The terminal, which has accepted the cooperation request, may also be called a cooperative participation terminal as stated above.

FIG. 9 illustrates that the first terminal 100*a* transmits the cooperation request message to cooperating terminal candidates which belong to the cooperative cluster, but the first terminal 100*a* may transmit the cooperation request message to the base station 200. Then the base station 200 may transmit the cooperation request message to the cooperating terminal candidates which belong to the cooperative cluster.

Thereafter, the resource allocation process (S340) between terminals may be performed. Specifically, the first terminal 100*a* transmits the resource allocation request message to the second terminal 100*b*, i.e., the cooperative participation terminal, in order to request the cooperative transmission of data. The second terminal, i.e., the cooperative participation terminal, allocates resources to the first terminal, i.e., the cooperation requesting terminal, and transmits information on the allocated resources.

The cooperating terminal search process (S330) and the resource allocation process between the terminals (S340) may be merged into one process.

For example, the resource allocation process between the terminals (S340) may be included in the cooperating terminal search process (S330). That is, the cooperation request message in the cooperating terminal search process (S330) may include the request for resource allocation, and the cooperation acceptance message may include information on the allocated resource. Further, alternatively, the cooperating terminal search process (S330) may be included in the resource allocation process between terminals (S340). That is, a cooperation request may be included in the resource allocation request message in the resource allocation process between terminals (S330), and the resource allocation message may include the cooperation acceptance.

Thereafter, the data sharing process (S350) is performed. That is, if resources are allocated from the second terminal 100*b*, the first terminal 100*a* shares data with the second terminal 100*b* by transmitting its own data to the second terminal 100*b*.

Subsequently, a resource allocation procedure (S360 or S371) from the base station may be performed. Specifically, one or more of the first terminal 100*a* and the second terminal 100*b* are allocated uplink resources from the base station 200 (S360 and S370). At this time, in the case in which the first terminal 100*a* has been allocated resources through the initial data transmission process (S320), the resource allocation procedure (S360) of the first terminal 100*a* may not be performed.

Subsequently, the cooperative transmission procedure (S390) may be performed. In the cooperative transmission procedure (S390), as illustrated in FIG. 9, both the first terminal 100*a* and the second terminal 100*b* may transmit data, or only the second terminal 100*b* may transmit data of the first terminal 100*a*.

Modified Example of Each Process Illustrated in FIG. 9, and Example of Information Transmitted and Received The flow of each process has been described above. Hereinafter, modified examples of each process and information transmitted and received in each process will be specifically described below.

Here, the modified examples may be divided into modified examples in the case in which the initial data transmission process (S320) is performed and modified examples in the case in which the initial data transmission process is not performed, and commonly applicable modified examples.

First, the modified examples in the case in which the initial data transmission process (S320) is performed will be described below.

the initial data transmission process (S320) and the cooperating terminal search process (S330) may be merged into one process. For example, the cooperation request message or indicator may be included in the resource allocation request message in the initial data transmission process (S320).

Such a cooperation request message or indicator may include at least one of the following sets of information.

Indicator Indicating Cooperation Request

As the identification information of the cooperation requesting terminal, the MSID (or STID) of the cooperation requesting terminal and the temporary ID of the cooperation requesting terminal may be included.

Further, in the case in which the first terminal 100*a* receives a resource allocation message from the base station 200 through the initial data transmission process (S320), the base station 200 may allocate the uplink resource for cooperative transmission in advance for one or more of the first terminal 100*a* and the second terminal 100*b*. Further, the base station 200 may transmit the uplink resource message separately or together when the resource allocation message is transmitted in the initial data transmission process (S320), to the first terminal 100*a*, the uplink resource message including information on the uplink resource allocated for the cooperative transmission. Further, the base station base station 200 may transmit another separate message to the second terminal 100*b*.

Likewise, in the case in which the uplink resources for cooperative transmission are allocated in advance, the resource allocation process (S360) by the first terminal 100*a* and the resource allocation process (S370) by the second terminal 100*b* may not be performed.

As an uplink resource allocation message including information on the uplink resource which the base station 200 has allocated for cooperative transmission, the message transmitted to one of the first terminal 100*a* and the second terminal 100*b* may include at least one of the following sets of information.

Cooperative Cluster ID

As identification information of a cooperation requesting terminal, one or more of the MSID (or STID) of the cooperation requesting terminal and the temporary ID of the cooperation requesting terminal may be included.

As base station uplink resource allocation information on the cooperation requesting terminal, at least one of the allocated resource size, the allocated resource location, the modulation and coding level (MCS), the MIMO information (e.g., MIMO scheme, PMI, rank indicator, etc.) may be provided.

As identification information of the cooperative transmission terminal, one of the MSID (or STID) of the cooperative transmission terminal and the temporary ID of the cooperative transmission terminal may be provided.

As the base station uplink resource allocation information on the cooperative transmission terminal, one or more of the allocated resource size, the allocated resource location, the modulation and coding level (MCS), the MIMO information (e.g., MIMO scheme, PMI, rank indicator, etc.) may be provided.

The CRC of such a resource allocation message may be masked as one of the MSID (or STID) of the terminal, the temporary ID of the terminal and the cooperative cluster ID. In particular, in order to easily support the RF combination in the base station, the CRC of the uplink resource allocation message is preferably masked with the common information on the terminals having cooperative transmission relation. Here, the common information for terminals may be one of the following sets of information.

Cooperative Cluster ID of the Terminal
  As a combination of part or the whole of the temporary IDs of terminals, it may be 1) a concatenation of part or the whole of temporary IDs of the terminals having cooperative transmission relation, or 2) a permutation of part or the whole of temporary IDs of terminals having cooperative transmission relation.
  As a combination of part or the whole of the MSID or the STID of terminals, it may be 1) a concatenation for part or the whole of the MSID (or STID) of the terminals having cooperative transmission relation or ii) a permutation for part or the whole of the MSID (or STID) of terminals having a cooperative transmission relation.
Temporary ID of the cooperation requesting terminal
  The MSID (or STID) of the cooperation requesting terminal Further, the initial data transmission process (S320) and the resource allocation process between terminals (S340) may be merged into one process. For example, if the first terminal 100a transmits the resource allocation request message in the above step S320 to the base station 200, the base station 200 may transmit the resource allocation request message between terminals in step S340 to the cooperating terminal candidates, which belong to the cooperative cluster, for example, the second terminal 100b, instead of the first terminal 100a. In this case, the cooperating terminal candidate, i.e., the second terminal 100b, may transmit the resource allocation message between terminals in the above step S340 to the base station 200, and the base station 200 may transmit the received resource allocation message to the first terminal 100a.

The resource allocation message, which the base station 200 transmits to the first terminal 100a, may include at least one of the following sets of information.
  Cooperative Cluster ID
    As identification information of the cooperation requesting terminal, it may include one or more of the MSID (or STID) of the request terminal and the temporary ID of the request terminal.
    As identification information of the cooperation requesting terminal, it may include one or more of the MSID (or STID) of the cooperative transmission terminal and the temporary ID of the cooperative transmission terminal.
    As resource allocation information for communication between terminals, one or more of the size of the allocated resources, the location of the allocated resources, the modulation and coding level (MCS), the MIMO information (MIMO scheme, PMI, rank indicator, etc.), the transmission power information (Tx power, power ratio, etc.), and the ACK/NACK transmission location may be provided.
  In the case in which the resource allocation message is referred to by all terminals having cooperative transmission relation, the process may be simplified. For example, the CRC of the resource allocation message for communication between terminals may be masked with the common information for the terminals mentioned above. If a separate resource allocation message is transmitted to a specific cooperative transmission terminal, the confirmation of the resource allocation message may be distinguished/identified using the indicator of the terminal. In this case, it is disadvantageous that the cooperative transmission terminal needs to transmit the resource allocation message again to the cooperation requesting terminal.
  Second, modified examples when the initial data transmission process (S320) is not performed will be described below.

As described above, the cooperating terminal search process (S330) and the resource allocation process (S340) between terminals may be merged into one process.

Further, as a modified example of the resource allocation process between terminals (S340), the first terminal 100a, which is a cooperation requesting terminal, may transmit requested information of resources to the second terminal 100b which is a cooperating terminal candidate. That is, the cooperation requesting terminal, i.e., the first terminal 100a, determines the desired location, size and transmission method in advance, and informs the cooperating terminal candidate, i.e., the second terminal, of such information.

Lastly, regardless of performance of the initial data transmission process (S320), a commonly applicable modified example will be described below.

In the above step S330, the base station may transmit the cooperation request message to the second terminal 100b instead of the first terminal 100a as shown in the above described modified example.

Here, the cooperation request message, which the base station 200 transmits instead of the first terminal 100a, includes at least one of the following sets of information so that the second terminal 100a may receive or transmit the following message (e.g., the resource allocation request message or data of the first terminal 100a).
  Cooperation Request Indicator
    As identification information of the cooperation requesting terminal, it may include one or more of the MSID (or STID) of the cooperation requesting terminal and the temporary ID of the cooperation requesting terminal.
  Cooperative cluster ID of the cooperation requesting terminal Further, in the above resource allocation process between terminals (S340), the resource allocation message transmitted by the first terminal 100a may include at least one of the following sets of information.
  Cooperation Request Indicator
    As identification information of the cooperative transmission terminal, one or more of the MSID (or STID) of the cooperative transmission terminal and the temporary ID of the cooperative transmission terminal may be provided.
    As the resource allocation request information for communication between terminals, the size of the transmitted data, the QoS of the transmitted data, and the data type may be provided.
    As resource allocation information for communication between terminals, one or more of the size of the transmitted data, the location of the transmitted data, the data transmission method (MIMO scheme, PMI, MCS, etc.), the data transmission power (transmit power, power headroom, etc.), and the ACK/NACK transmission location may be provided.

Further, the resource allocation message transmitted in the cooperating terminal candidate may include at least one of the following sets of information.
  Cooperative Acceptance Indicator
    As the identification information of the cooperative transmission terminal, at least one of the MSID (or STID) of the cooperative transmission terminal, and the temporary ID of the cooperative transmission terminal may be provided.
    As the resource allocation information, one or more of the size of the allocated resources, the location of the allocated resources, the modulation and coding level (MCS), MIMO information (MIMO scheme, PMI, rank indicator, etc.), transmission power information (Tx power, power ratio, etc.), and ACK/NACK transmission location may be provided.

Such a resource allocation request and allocation message have a danger of information security breach, and are preferably set to be detected by the temporary ID of the terminal. That is, the CRC of the message may be masked with the temporary ID of the cooperation requesting terminal.

Further, before performing steps S330 and S340, the base station 200 may perform a procedure for helping the cooperating terminal candidate to prepare for cooperation. To this end, the base station 200 may wake the second terminal 100b from the sleep mode by transmitting the positive traffic indicator, etc. to the second terminal 100b, or may transition the second terminal 100b from the idle mode by transmitting a paging message.

Figure 10:
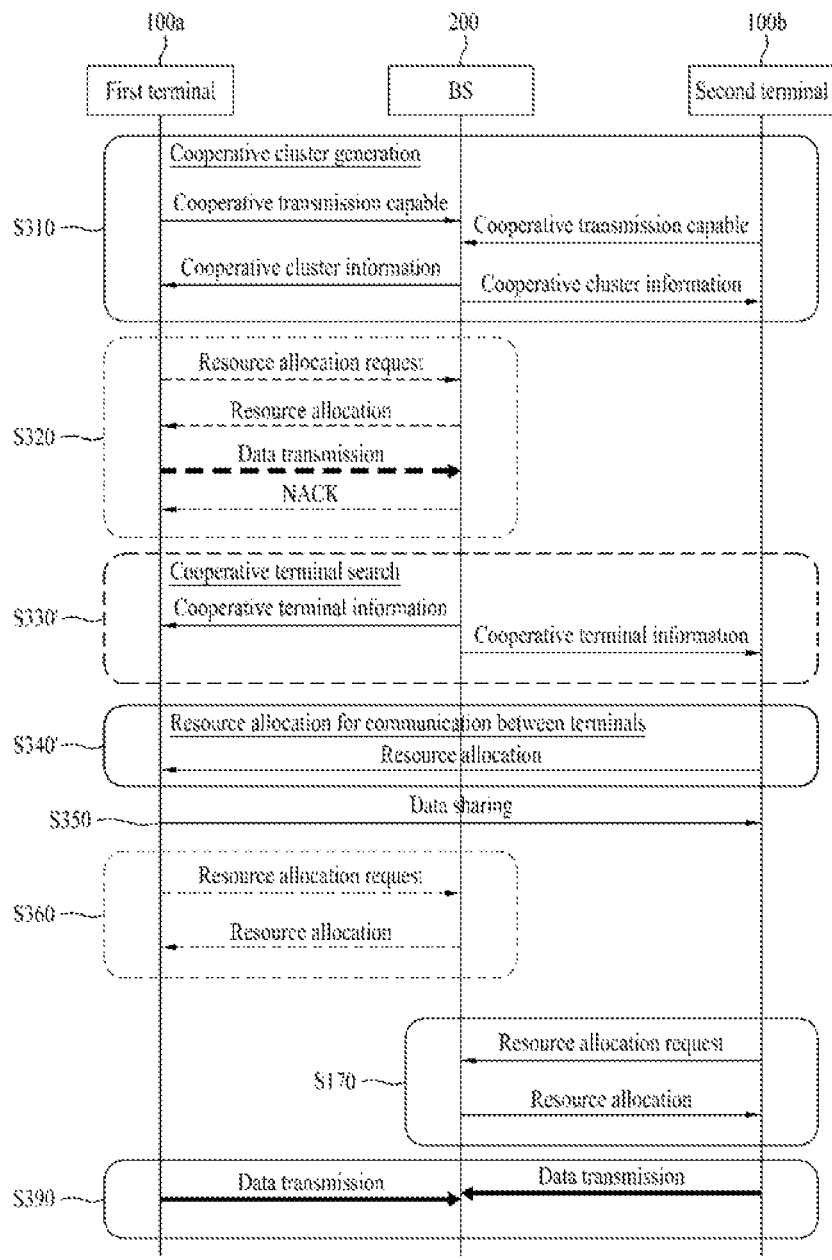
FIG. 10 illustrates a modified method of the method illustrated in FIG. 9.

FIG. 10 illustrates a modified example of a method illustrated in FIG. 9.

Referring to FIG. 10, similarly to FIG. 9, the base station 200 generates a cooperative cluster, and informs the first terminal 100a and the second terminal 100b of information on the cooperative cluster.

However, FIG. 10 illustrates that the cooperating terminal search procedure (S330') and the resource allocation process between terminals (S340') are modified from FIG. 9.

Hereinafter, the description will center on portions which are different from the description of FIG. 9, and redundant content will not be described here.

In the modified cooperating terminal search procedure (S330'), even if a cooperation request is not received, the base station 200 determines terminals to cooperate, and transmits information on the cooperating terminals to terminals determined to cooperate with each other. Further, according to the modified resource allocation process between terminals, even if the resource allocation request between terminals is not received, the second terminal 100b may transmit the resource allocation message to the first terminal 100a. At this time, the second terminal 100b may transmit the resource allocation message to the base station 200, and transmit the resource allocation message to the first terminal 100a.

Other descriptions about each process illustrated in FIG. 10 are similar to those of FIG. 9, and thus they will be omitted here.

Modified Example of Each Process Illustrated in FIG. 10, and Example of Information Transmitted and Received Hereinafter, the description will center on modified examples of each process and information transmitted and received in each process.

Here, as described above, the modified examples may be divided into a modified example in the case in which the initial data transmission process (S320) is performed, a modified example in the case in which the initial data transmission process is not performed, and a commonly applicable modified example.

First, the modified examples in the case in which the initial data transmission process (S320) is performed will be described below.

The initial data transmission process (S320) and the cooperating terminal search process (S330') may be merged into one process. For example, the resource allocation message in the initial data transmission process (S320) may include information on cooperating terminals determined by the base station 200 in the above step 130', for example, cooperating terminal information.

Further, in the case in which the first terminal 100a receives a resource allocation message from the base station 200 through the initial data transmission process (S320), the base station 200 may allocate uplink resources for cooperative transmission in advance for one or more of the first terminal 100a and the second terminal 100b. Further, the base station may transmit, to the first terminal 100a, the uplink resource message separately or together when the resource allocation message is transmitted in the initial data transmission process (S320), the uplink resource message including the information for the uplink resource allocated for cooperative transmission. Further, the base station 200 may transmit a separate message to the second terminal 100b.

Likewise, when the uplink resource for cooperative transmission is allocated in advance, the resource allocation process (S360) by the first terminal 100a and the resource allocation process (S370) by the second terminal 100b may not be performed.

The resource allocation message for cooperative transmission may include the following sets of information.

As a grant type indicator for cooperative transmission, the indicator indicates that the resource allocation message is a resource allocation message for uplink transmission through cooperative transmission between terminals.

Cooperative Cluster ID

As identification information of the cooperative request terminal, the MSID (or STID) of the cooperation requesting terminal and the temporary ID of the cooperation requesting terminal may be provided.

As the uplink resource allocation information of the base station for the cooperation requesting terminal, one or more of the size of the allocated resources, the location of the allocated resources, modulation and coding level (MCS), and the MIMO information (MIMO scheme, PMI, rank indicator, etc.) may be provided.

As identification information of the cooperative transmission terminal, the MSID (or STID) of the cooperative transmission terminal and the temporary ID of the cooperative transmission terminal may be provided.

Further, when the base station transmits the uplink resource allocation information to the first terminal 100a, the uplink resource allocation information of the cooperative transmission terminal, i.e., the second terminal, may be transmitted together. Here, the uplink resource allocation information transmitted to the first terminal 100a may include the following sets of information.

As the uplink resource allocation information on the cooperative transmission terminal (e.g., the second terminal), one or more of the size of the allocated resources, the location of the allocated resources, modulation and coding level (MCS), and the MIMO information (MIMO scheme, PMI, rank indicator, etc.) may be provided.

Such uplink resource allocation information may be transmitted to the first terminal 100a only or to both the first terminal 100a and the second terminal 100b. When transmitted to both the first terminal 100a and the second terminal 100b, the uplink resource allocation information may be the same or different from each other.

Further, the initial data transmission process (S320) and the resource allocation process (S340') may be merged into one process. For example, if the first terminal 100a transmits the resource allocation request message to the base station 200 in the above step S320, the base station 200 may transmit the resource allocation request message between terminals in step S340 to the cooperating terminal candidates, which belong to the cooperative cluster, for example, the second terminal 100b instead of the first terminal 100a. However, to this end, the base station 200 may recognize link information between terminals. To this end, the cooperating terminal candidate, i.e., the second terminal 100b, transmits the resource allocation message between terminals in the above step S340' to the base station, and the base station may transmit the received resource allocation message to the first terminal 100*a*.

The resource allocation message for the resources between terminals, which the base station transmits to the first terminal 100*a*, may include at least one of the following sets of information. To this end, a restrictive modulation and coding level should be applied to communication between terminals.

As the uplink resource allocation information of the cooperation requesting terminal for the cooperative transmission terminal (resource allocation information on communication between terminals), one or more of the size of the allocated resources, the location of the allocated resources, modulation and coding level (MCS), the MIMO information (MIMO scheme, PMI, rank indicator, etc.), and the transmission power information (Tx power, power ratio, etc.) may be provided.

Further, the cooperating terminal search process (S330') and the resource allocation process between terminals (S340') may be merged into one process.

For example, in the terminal search process (S330'), the cooperating terminal information, which the base station 200 transmits to the cooperation requesting terminal, i.e., the first terminal 100*a*, may include the following sets of information.

As the resource allocation indicator (grant type indicator) for cooperative transmission, the indicator may indicate that the information is resource allocation information which the base station transmits to the cooperation requesting terminal, or may indicate that the information is resource information which the cooperative transmission terminal allocates to the cooperation requesting terminal for communication between terminals received by the cooperative transmission terminal. That is, the cooperation requesting terminal may transmit data to the cooperative transmission terminal through the resource area.

Cooperative Cluster ID

The MSID (or STID) of the cooperation requesting terminal

The temporary ID of the cooperation requesting terminal

As resource allocation information for communication between terminals, the resource allocation information is resource allocation information which the cooperative transmission terminal transmits to the cooperation requesting terminal.

The CRS of the resource allocation information may be masked with one of the MSID (or STID) of the cooperation requesting terminal, the temporary ID of the cooperation requesting terminal, and the cooperative cluster ID.

As another example, in the terminal search process (S330'), the cooperating terminal information, which the base station 200 transmits to the cooperative transmission terminal, i.e., the second terminal 100*b*, may include the following sets of information.

As the resource allocation indicator (grant type indicator) for cooperative transmission, the indicator may indicate that the information is resource allocation information which the base station transmits to the cooperative transmission terminal. Further, the indicator may indicate that the information is resource information which the cooperative transmission terminal allocates to the cooperation requesting terminal for communication between terminals received by the cooperative transmission terminal. That is, as the resource allocation information which the base station transmits to the cooperative transmission terminal, the cooperative transmission terminal communicates with the cooperative transmission terminal using the resource.

Cooperative Cluster ID

As identification information of the cooperation requesting terminal, the MSID (or STID) of the cooperation requesting terminal or the temporary ID of the cooperation requesting terminal may be provided.

As identification information of the cooperative transmission terminal, the MSID (or STID) of the cooperative transmission terminal or the temporary ID of the cooperative transmission terminal may be provided.

As uplink resource allocation information, the uplink resource allocation information is resource allocation information for the cooperative transmission terminal. Such uplink resource allocation information may include one or more of the size of the allocated resources, the location of the allocated resources, modulation and coding level (MCS), the MIMO information (MIMO scheme, PMI, rank indicator, etc.), and the transmission power information (Tx power, power ratio, etc.).

As resource allocation information for communication between terminals, it is resource allocation information which the cooperative transmission terminal transmits to the cooperation requesting terminal. The information may include one or more of the size of the allocated resources, the location of the allocated resources, modulation and coding level (MCS), the MIMO information (MIMO scheme, PMI, rank indicator, etc.), the transmission power information (Tx power, power ratio, etc.), and ACK/NACK transmission location.

The CRS of the resource allocation information may be masked with one of the MSID (or STID) of the cooperative transmission terminal, the temporary ID of the cooperative transmission terminal, and the cooperative cluster ID.

Further, as a modified example, the resource allocation information for communication between terminals transmitted by the base station 200 may be simply composed of the allocation size or/and the location. In this case, the terminals having the cooperative transmission relation determine detailed resource allocation information and control information which is necessary for data transmission while exchanging control information with each other.

As another modified example, the resource allocation information for communication between terminals provided by the base station 200 provides all resource allocation information which is necessary for data transmission. In this case, the cooperation requesting terminal transmits data according to the information received by the base station, and the cooperative transmission terminal receives data according to the information determined by the base station.

Figure 11:
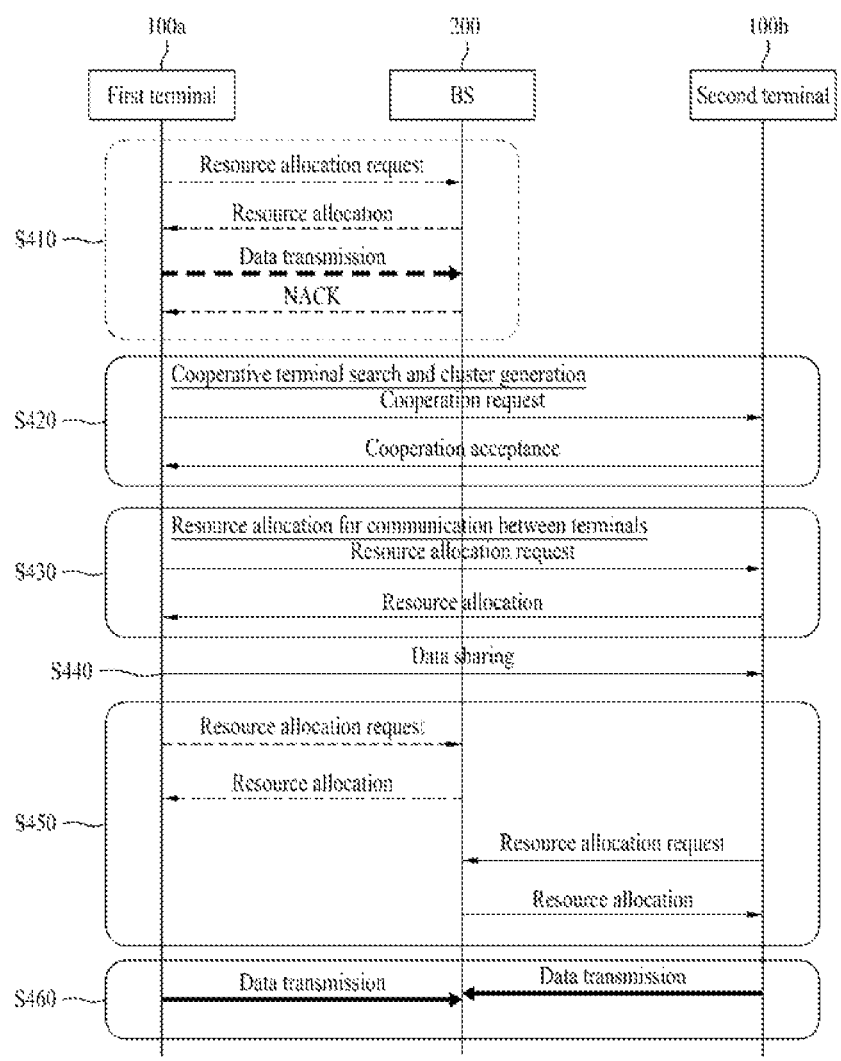
FIG. 11 illustrates another method for cooperative transmission by terminals.

FIG. 11 illustrates another method for cooperative transmission by terminals.

The processes illustrated in FIG. 11 are similar to those of FIGS. 9 and 10. However, FIG. 11 illustrates that a cooperative cluster is generated through a cooperating terminal search process performed between terminals unlike FIG. 9. Hence, hereinafter, the description will center on distinctive portions, and similar content will be omitted here.

The first terminal 100*a* performs the initial data transmission process (S410). Specifically, the first terminal 100*a* requests a resource allocation request message or signal to the base station 200, and if resources are allocated from the base station 200, data is transmitted. In response to the data transmission, the base station 200 may transmit a negative response (e.g., NACK signal or message).

Likewise, when the initial data transmission process (S410) has been performed, if the process fails, the cooperating terminal search and cluster generation process (S420) may be performed. Alternatively, it is possible for the cooperating terminal search and cluster generation process (S420) to be performed without performance of the initial data transmission process (S410).

The cooperating terminal search and cluster generation process (S420) may be performed without performance of the initial data transmission process (S410) when the channel situation is poor or in other situations.

Thereafter, the cooperating terminal search and cluster generation process (S420) will be described below. When the first terminal 100a and the second terminal 100b perform the initial data transmission process, of the process fails, the cooperative cluster is generated (S420). The cooperative cluster may also be generated without performance of the initial data transmission process (S410). Specifically, when the cooperative cluster is generated, if the first terminal 100a requests cooperation of the second terminal 100b and the second terminal 100b accepts the cooperation request, the first terminal 100a and the second terminal 100b bind each other with the cooperative cluster.

At this time, the cooperation requesting terminal, e.g., the first terminal 100a, may request cooperation of another terminal and generate and allocate a cooperative cluster ID. Further, the cooperating terminal candidate, e.g., the second terminal 100b, may accept cooperation, and generate and allocate a cooperation cluster ID. Further, the first terminal 100a and the second terminal may generate and allocate a unique temporary ID which may identify a terminal in the cooperation cluster.

Thereafter, the resource allocation process (S430) for communication between terminals is performed. This process is similar to step S340 of FIG. 9, and thus this will not be redundantly described here. Further, the cooperating terminal search and cluster generation process (S420) and the resource allocation process for communication between terminals (S430) may be merged into one process. This may be easily understood by those skilled in the art with reference to the description of FIGS. 9 and 10, and thus will not be described here.

Thereafter, the data sharing process (S440) is performed. This process is similar to step S340 of FIG. 9, and thus will not be described here.

Thereafter, the resource allocation process for the first terminal 100a (S450) and the resource allocation process for the second terminal (S460) are performed. These two processes (S450 and S460) are similar to those of steps S360 and S370, and thus they will not be described here.

The above description may be referred to for these processes, and the processes will be separately described here. However, it should be noted that in step S450, the resource allocation request of the second terminal 100b may be omitted. That is, if the uplink resource allocated to the first terminal 100a is utilized by the second terminal 100b, the second terminal 100b may not be separately allocated the uplink resource.

Modified example of each process illustrated in FIG. 11, and example of information transmitted and received.

The flow of each process has been described above. Hereinafter, the description will center on modified examples of each process and information transmitted and received in each process.

In the above step S420, the cooperation request message, which the first terminal 100a transmits to the second terminal 100b (that is, from the cooperation requesting terminal to the cooperating terminal candidate), may include at least one of the following sets of information.

As a cooperation request indicator, the indicator indicates the cooperation request which the first terminal transmits to the second terminal.
- As identification information of the cooperation requesting terminal (e.g., the first terminal), the MSID (or STID) of the cooperation requesting terminal and the temporary ID of the cooperation requesting terminal may be provided.
- Cooperative cluster ID of the cooperation requesting terminal
- As channel information for the base station uplink of the cooperation requesting terminal, the CQI for the base station uplink and the reception SINR for the base station uplink (or downlink) may be provided.
- As resource allocation request information of the cooperation requesting terminal, the resource allocation request information includes at least one of the following sets of information. Data information of the terminal to be transmitted (the original information size, QoS, etc.) and uplink resource allocation information received from the base station (e.g., the resource location, allocation size, modulation & coding level, MIMO scheme, PMI, etc., or the grant information size, QoS, etc.)

Further, as stated above, step S420 and step S430 may be merged into one process.

First, the resource allocation request message at step S430 may be included in the cooperation request message at step S420. On the other hand, even if merged, the first terminal may separately transmit the cooperation request message and the resource allocation request message.

Here, the cooperation request message of the first terminal 100a may include at least one of the following sets of information. That is, the cooperation requesting terminal, i.e., the first terminal 100a, may request cooperative transmission including the resource allocation request information.

As the cooperative request indicator, the indicator may indicate the cooperation request which the terminal transmits to another terminal, or indicate the cooperation request and the resource allocation request which the terminal transmits to another terminal.
- As identification information of the cooperation requesting terminal, the MSID (or STID) of the cooperation requesting terminal or the temporary ID of the cooperation requesting terminal may be provided.
- Cooperative cluster ID of the cooperation requesting terminal
- As channel information for the base station uplink of the cooperation requesting terminal, the CQI for the base station uplink and the reception SINR for the base station uplink (or downlink) may be provided.
- As resource allocation request information of the cooperation requesting terminal, data information of the terminal to be transmitted (e.g., the original information size, QoS, etc.) may be provided.

Further, in the case in which steps S420 and S430 are merged into one process, the cooperation acceptance message of the cooperating terminal candidate, i.e., the second terminal 100b, at step S420 may include resource allocation information. Such a cooperation acceptance message may include at least one of the following sets of information.

As the cooperation acceptance (confirmation) indicator, the indicator may indicate that the message is a cooperative transmission message which the cooperative transmission terminal transmits to the cooperation requesting terminal, or may indicate that the message is a resource allocation message which the cooperative transmission terminal transmits to the cooperation requesting terminal.

As the identifier of the cooperative transmission terminal, the MSID (or STID) of the cooperative transmission terminal, the temporary ID of the cooperative transmission terminal, and the cooperative cluster ID of the cooperative transmission terminal (same as the cooperative cluster ID of the cooperation requesting terminal) may be provided.

As the identifier of the cooperation requesting terminal, the MSID (or STID) of the cooperation requesting terminal, the temporary ID of the cooperation requesting terminal, and the cooperative cluster ID of the cooperation requesting terminal may be provided.

As resource allocation information on the cooperation requesting terminal, the resource allocation information (Resource size, Resource location, MCS, etc.), information on the transmission method (e.g., MIMO Scheme, PMI, Rank Indicator, etc.), and information on ACK/NACK transmission location may be provided.

Further, when steps S420 and S430 are merged into one process, the resource allocation information may be included in the cooperation request message which the first terminal 100a transmits to the cooperating terminal candidate. That is, the cooperation requesting terminal decides the desired location, size and transmission method in advance, and informs the cooperating terminal candidate of such decision. In this case, the above mentioned resource allocation request information may be substituted to include at least one of the following sets of information.

As resource allocation information of the cooperation requesting terminal, at least one of the size of the transmitted data, the location of the transmitted data, the data transmission method (MIMO scheme, PMI, MCS, etc.), the data transmission power (transmit power, power headroom, etc.), and ACK/NACK transmission location information may be provided.

If steps S420 and S430 are merged into one process, the cooperation request message may be included in the resource allocation request message at step S430. Here, the resource allocation request message may include at least one of the following sets of information.

As the cooperation request indicator, the indicator may indicate the resource allocation request between terminals which the terminal transmits to another terminal.

As identification information of the cooperation requesting terminal, the MSID (or STID) of the cooperation requesting terminal, and the temporary ID of the cooperation requesting terminal may be provided.

Cooperative cluster ID of the cooperation requesting terminal

As identification information of the cooperative transmission terminal, the MSID (or STID) of the cooperative transmission terminal, and the temporary ID of the cooperative transmission terminal may be provided.

As channel information on the base uplink of the cooperation requesting terminal, the CQI on the base station uplink and the reception SINR on the base station uplink (or downlink) may be provided.

As resource allocation request information of the cooperation requesting terminal, data information of the terminal to be transmitted (the original information size, QoS, etc.) and uplink resource allocation information received from the base station (e.g., the resource location, allocation size, modulation & coding level, MIMO scheme, PMI, etc., or the grant information size, QoS, etc.) may be provided.

Further, as a modified example of step S430, the first terminal 100a, which is the cooperation requesting terminal, may transmit information of the resource requested to the second terminal 100b, which is the cooperating terminal candidate. That is, the location, size and transmission method desired by the cooperation requesting terminal, i.e., the first terminal 100a, are decided in advance, and the cooperating terminal candidate, i.e., the second terminal 100b is informed of the decision. The requested resource information may include the following sets of information.

As resource allocation information of the cooperation requesting terminal, at least one of the size of the transmitted data, the location of the transmitted data, the data transmission method (MIMO scheme, PMI, MCS, etc.), the data transmission power (transmit power, power headroom, etc.), and the ACK/NACK transmission location may be provided.

The resource allocation information may include the cooperation request of the second terminal.

The CRC message including such information may be masked with one of the MSID (or STID) of the cooperation requesting terminal, the temporary ID of the cooperation requesting terminal and the cooperative cluster ID.

Further, in step S430, the cooperating terminal candidate, i.e., the resource allocation message of the second terminal 100a may include at least one of the following sets of information.

As the cooperation acceptance (confirmation) indicator, the indicator may indicate the resource allocation message which the cooperative transmission terminal transmits to the cooperation requesting terminal.

As the identifier of the cooperative transmission terminal, the MSID (or STID) of the cooperative transmission terminal, the temporary ID of the cooperative transmission terminal, and the cooperative cluster ID of the cooperative transmission terminal (same as the cooperative cluster ID of the cooperation requesting terminal) may be provided.

As the identifier of the cooperation requesting terminal, the MSID (or STID) of the cooperation requesting terminal, the temporary ID of the cooperation requesting terminal, and the cooperative cluster ID of the cooperation requesting terminal may be provided.

As resource allocation information on the cooperation requesting terminal, the size of the transmitted data, the location of the transmitted data, the data transmission method (MIMO scheme, PMI, MCS, etc.), the data transmission power (transmit power, power headroom, etc.), and the ACK/NACK transmission location may be provided.

Further, in step S450, it should be confirmed that the data received through the uplink resource allocated to the first terminal 100a and the second terminal 100b belong to the first terminal 100a, and thus the resource allocation request message, which the second terminal 100b transmits to the base station 200, may include the following information.

As identification information of the cooperative transmission terminal, the MSID (or STID) of the cooperative transmission terminal, or the temporary ID of the cooperative transmission terminal may be provided.

As identification information of the cooperation requesting terminal, the MSID (or STID) of the cooperation requesting terminal or the temporary ID of the cooperation requesting terminal may be provided.

Cooperative cluster ID of the cooperation requesting terminal

As resource allocation information of the cooperation requesting terminal, the original information size and QoS, etc. may be provided.

At step S450, the second terminal 100b may not make a separate uplink resource allocation request 200 to the base station 200, and may transmit data using uplink resources allocated by the base station 200 for the first terminal 100a.

Further, in step S450, the first terminal 100a and the second terminal 100b may be allocated each uplink resource from the base station 200. However, in this case, the resource allocation information received by the first terminal 100a is disused, and only the cooperative transmission terminal, i.e., the second terminal 100b, may transmit data using the allocated uplink resource instead of the first terminal 100a.

At this time, when requesting the uplink resource and transmitting data, the cooperative transmission terminal, i.e., the second terminal 100b, may use information of the first terminal 100a. Hence, the base station uplink resource allocation request of the terminal and the uplink resource allocation message of the base station may include at least one of the following sets of information.

MSID or STID of the cooperation requesting terminal

Temporary ID of the cooperation requesting terminal

Cooperative cluster ID of the cooperation requesting terminal

At step S450, uplink resource allocation is respectively performed by the cooperation requesting terminal and the cooperative transmission terminal. However, even in such a case, if RF combining is performed in the base station, one of the cooperation requesting terminal or the cooperative transmission terminal masks the CRC with the common information, and the base station 200 is preferably operated as the cooperation requesting terminal has requested the base station uplink resource allocation. In this case, it is preferable that the base station also allocates resources using common identification information between cooperative transmission terminals including the cooperation requesting terminal.

Further, in cooperative transmission, the channel assumption between terminals of the data communication between terminals is not easy, and thus it is preferable that the data transmission method be limited to the maximum rank 1 or rank 2. In particular, it is preferable that the open-loop MIMO transmission method is used.

For example, the data transmission method on communication between terminals may be one of Open-loop SM (Rank 2), Tx Diversity (Rate 1) SFBC, and Rank 1 Random Beamforming transmission methods.

Figure 12:
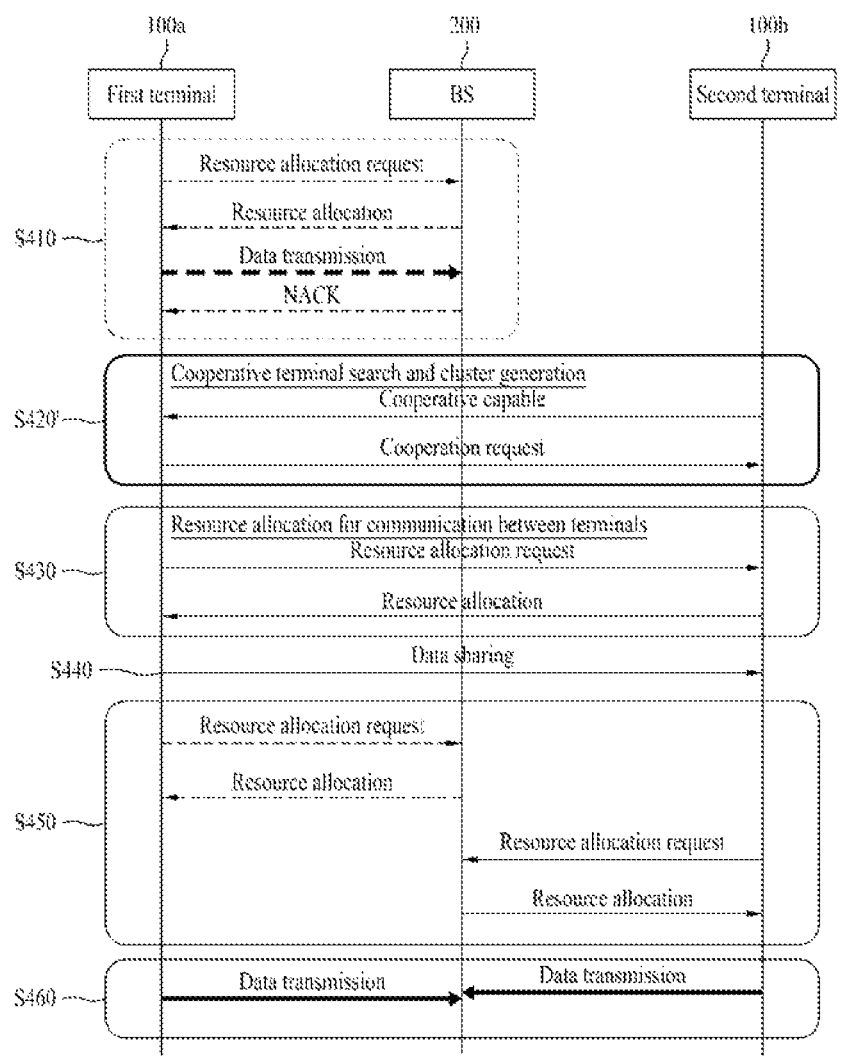
FIG. 12 illustrates a modified method of the method illustrated in FIG. 11.

FIG. 12 illustrates a modified example of a method illustrated in FIG. 11.

Unlike FIG. 11, FIG. 12 illustrates that the cooperating terminal search and cluster formation process (S220') has been modified.

Hereinafter, the description will center on portions which are different from FIG. 11, and redundant portions will be omitted here.

When generating the cooperative cluster (S420'), the second terminal 100b first transmits the cooperative transmission capable message, and the first terminal 100a receives the cooperation capable message and may then transmit the cooperation request message to the second terminal 100b.

Here, the cooperative transmission capable message of the cooperating terminal candidate, i.e., the second terminal 100b, may include at least one of the following sets of information.

As identification information of the cooperative transmission terminal, the MSID (or STID) of the cooperative transmission terminal or the temporary ID of the cooperative transmission terminal may be provided.

Cooperative cluster ID of the cooperation requesting terminal

As allocation capable resource information of the cooperative transmission terminal, at least one of the resource allocation information (e.g., resource size and resource location), the transmission method (e.g., MIMO scheme, PMI, rank indicator, etc.) and ACK/NACK transmission location may be provided.

At the above step S420', the cooperation request message, which the first terminal 100a transmits to the second terminal 100b (i.e., from the cooperation requesting terminal to the cooperating terminal candidate), may include at least one of the following sets of information may be provided.

As the cooperation request indicator, the indicator indicates a cooperation request which the first terminal transmits to the second terminal.

As identification information of the cooperation requesting terminal (e.g., the first terminal), the MSID (or STID) of the cooperation requesting terminal and the temporary ID of the cooperation requesting terminal may be provided.

Cooperative cluster ID of the cooperation requesting terminal

As channel information on the base station uplink of the cooperation requesting terminal, the CQI on the base station uplink, and the reception SINR on the base station uplink (or downlink) may be provided.

As resource allocation request information of the cooperation requesting terminal, the resource allocation request information includes at least one of the following sets of information; data information of the terminal to be transmitted (original information size, QoS, etc.) and the uplink resource allocation information received from the base station (e.g., resource location, allocation size, modulation & coding level, MIMO scheme, PMI, etc.) or grant information size, QoS, etc.

Hereinafter, as another embodiment suggested in the present specification, a method of efficiently managing power of the cooperating terminal candidates in the cooperative transmission system will be described.

First, in a terminal cooperative transmission system, if the terminals participating in cooperative transmission are cooperative transmission capable, but are not able to participate in cooperative transmission for their own data transmission or their power is not sufficient, the terminals may reject cooperative transmission or the base station may control this situation.

Further, in order to prevent unnecessary power waste on terminals participating in cooperative transmission or to control power on cooperative transmission signals received by the base station, terminals to participate in cooperative transmission may be additionally limited by the following two methods.

1. Probabilistic Collaboration

The following participation rate adjustment method is suggested with a purpose of leveling battery consumption of terminals by allowing terminals within the cluster to indiscriminately participate in cooperative transmission while maintaining the intensity of the received signal of the base station at a constant level.

The cooperative transmission participation rate may be stipulated in advance, and the participation rate of terminals within the cluster may be adjusted. Further, the non-participation rate of terminals, which do not participate in cooperative transmission, may be stipulated in advance, and the participation rate of the terminals within the cluster may be adjusted.

For example, if the value, which is produced by a random value between 0 and 1 that is generated by a terminal, exceeds a threshold, the terminal becomes a terminal to participate in cooperative transmission, and if the value does not exceed the threshold, the terminal becomes a terminal not to participate in cooperative transmission. The range of the random value may be an arbitrary range like 0 to 100. The threshold may be notified by the base station, or may be a predefined value.

Only terminals, which are terminals to participate in cooperative transmission and have successfully decoded packets of another terminal, actually perform transmission to the base station. The event, which generates a random value, is preferably performed before decoding packets of another terminal because unnecessary decoding may be avoided. Hence, it is preferable that only terminals, which have been decided to participate by generating a random value, decode packets of others terminals.

In the case in which the packets transmitted through cooperative transmission should be retransmitted by a reception error, (even if a random value is generated between transmission and retransmission), the terminal's participation/non-participation status is not changed. Further, the terminal, which participates in cooperative transmission, does not generate a random value until the terminal receives an ACK signal from the base station.

Figure 13:
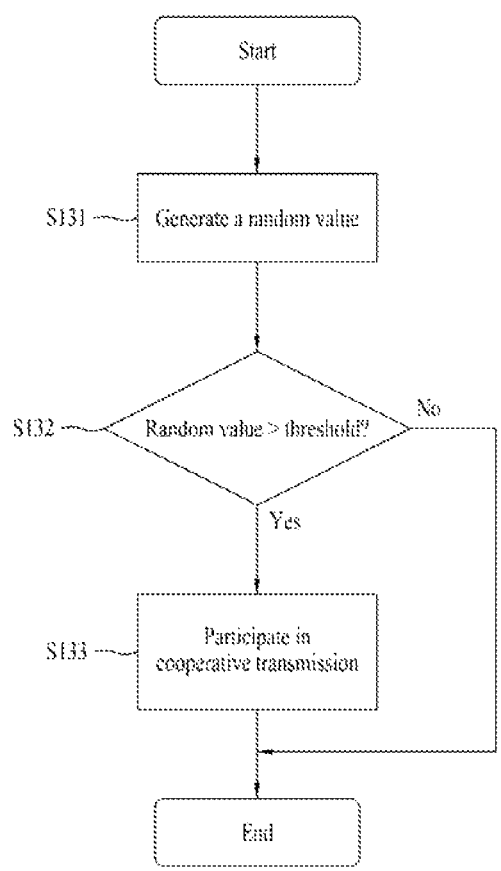
FIG. 13 is a flowchart illustrating a method for selecting terminals participating in cooperative transmission using probabilistic collaboration according to an exemplary embodiment of the present invention.

FIG. 13 is a flowchart illustrating an example of a method for selecting terminals to participate in cooperative transmission using probabilistic collaboration according to an exemplary embodiment of the present invention.

Referring to FIG. 13, a terminal generates a random value having a preset range (S131). The random value may have a value of a range between 0 and 1 or between 0 and 100.

Thereafter, the terminal compares the generated random value with a threshold which is a criterion for determining whether to participate in cooperative transmission (S132), and determines whether to participate in cooperative transmission based on the result of the comparison. Here, the terminal refers to a cooperating terminal candidate which belongs to at least one cooperative cluster.

As a result of the comparison, if the generated random value is larger than the threshold which is a criterion for determining whether to participate in cooperative transmission, the terminal becomes a terminal to participate in cooperative transmission, and receives data from the cooperation requesting terminal (S313).

The terminal performs cooperative transmission by transmitting data received from the cooperation requesting terminal to the base station.

Here, even if retransmission on data transmitted to the base station occurs, this does not affect the determined cooperative transmission participation status.

Further, as a result of the comparison, if the generated random value is smaller than the threshold which is the criterion for determining whether to participate in cooperative transmission, the terminal is not a terminal to participate in cooperative transmission. Hence, the terminal does not perform cooperative transmission which receives data from the cooperation requesting terminal and transmits the received data to the base station.

The threshold may be transmitted from the base station, or may be a predefined value.

2. Weighted Collaboration

Weight is given to a terminal which participates in cooperative transmission. An example of calculating weight on the number of times of cooperative transmission is shown below.

$$W = \left\{ \frac{N_{CT}[i]}{(avg(N_{CT}))^\alpha} \right\}_T,$$

Weight on whether to participate in cooperative transmission for the $i^{th}$ terminal during a specific time period (T).

T: It is a time window for calculating weight, and the following two cases may be considered.
Period when the cooperative cluster is formed
Time during which the terminal participates in cooperation (that is, even if participated in different cooperation clusters, the total period for this)

NCT[i]
The number of times by which the $i^{th}$ terminal participates during period T
Period for which the $i^{th}$ terminal participates in cooperative transmission during period T avg(NCT)
The average number of times by which cooperating terminals within the cooperation cluster participate in cooperative transmission during period T If T has been used to mean the $ii^{th}$, the average of the average NCT in each cooperation cluster. For example, the average between the average NCT of the cooperation cluster until the previous time and the average NCT until now.

α: fairness exponent factor (default value: 1)

In contrast, in a reverse manner, weight may be given to terminals which do not participate in cooperative transmission.

To this end, the base station produces the number of times of participation in cooperative transmission of the terminal, and the statistical data on participation using at least one during the participation period, and informs the terminal of the information.

As another method, the terminal periodically reports the avg(NCT) to the base station. Further, when requesting cooperative transmission through the base station, the terminal may report the value to the base station.

The base station may determine whether the terminal should participate in cooperative transmission by multiplying the weight by the data transmission rate and transmission amount. The weight may be applied with the weight for scheduling.

As another exemplary embodiment, the base station selects a cooperative transmission terminal by comparing the weight, which has been calculated using statistical data on cooperative transmission participation reported by the terminal, with the threshold which has been determined by the base station or has been predefined.

As another exemplary embodiment, weight is calculated by the terminal, and by comparing the weight with the threshold notified by the base station, only terminals, which satisfy a preset condition (larger or smaller than the threshold), participate in cooperative transmission.

Figure 14:
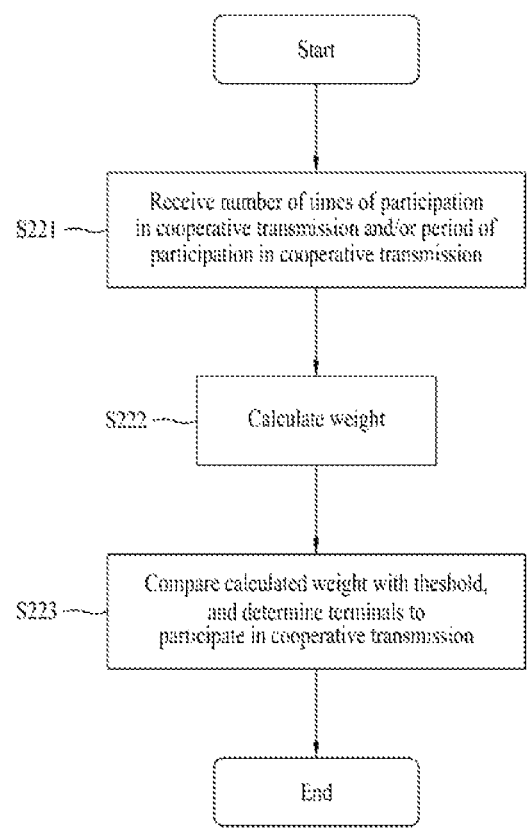
FIG. 14 is a flowchart illustrating a method for selecting terminals participating in cooperative transmission using weighted collaboration according to another exemplary embodiment of the present invention.

FIG. 14 is a flowchart illustrating a method of selecting terminals to participate in cooperative transmission using weighted collaboration according to further another exemplary embodiment of the present invention.

Referring to FIG. 14, the base station receives information on cooperative participation including at least one of the number of times of participation in cooperative transmission and the participation period from at least one cooperating terminal candidate (S221).

Thereafter, the base station calculates weight to be given to the terminal participating in cooperative transmission, on the basis of the received cooperative participation information (S222). Here, the weight may be calculation by formula 1 above.

Thereafter, the base station compares the calculated weight with the critical value which is the criterion for determining whether to participate in cooperative transmission, and determines the terminals to participate in cooperative transmission according to the result of the comparison (S223).

Here, the base station may determine terminals to participate in cooperative transmission by multiplying the calculated weight by the data transmission rate and/or transmission amount, or may determine terminals to participate in cooperative transmission by applying the calculated weight along with the weight for scheduling.

The above described embodiments and modified embodiments may be combined. Hence, each embodiment is not always solely implemented, but may be combined and then implemented. Such a combination may be easily implemented by those skilled in the art who have read this specification, and thus such a combination will be described here in detail. However, even if not described here, such combinations should be considered included in the present invention.

The embodiments and modified embodiments of the present invention may be implemented through various means. For example, the embodiments of the present invention may be implemented through hardware, firmware, software or a combination thereof, etc.

In the case of an implementation by hardware, the method according to embodiments of the present invention may be implemented by one or more of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of implementation by firmware or software, the method according to embodiments of the present invention may be implemented in the form of a module, procedure, function, etc. for performing functions or operations described above. The software code may be stored in a memory unit and may be operated by the processor. The memory unit may be positioned inside or outside the processor, and may exchange data with the processor by various already known means.

The method according to the present invention may be stored in the storage medium (e.g., an internal memory, a flash memory, a hard disk drive, etc.), and may be implemented by codes or commands within a software program which may be executed by a processor (e.g., a microprocessor). This will be described with reference to FIG. 13.

Figure 15:
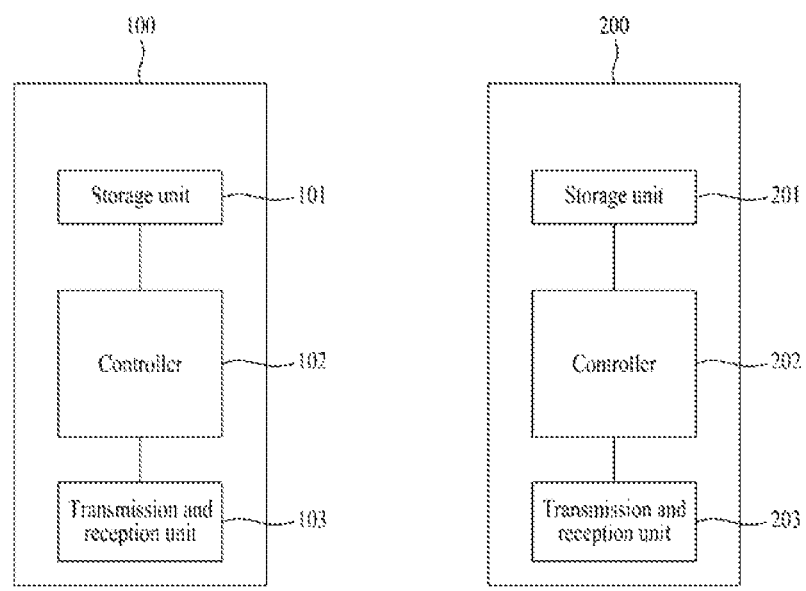
FIG. 15 is a block diagram of a terminal 100 and a base station according to the present invention.

FIG. 15 is a block diagram of a terminal 100 and a base station according to the present invention.

As illustrated in FIG. 15, the terminal 100 includes a storage unit 101, a controller 102 and a transmission and reception unit 103. Further, the base station 200 includes a storage unit 201, a controller 202 and a transmission and reception unit 203.

The storage units 101 and 201 store methods illustrated in FIGS. 1 to 14.

The controllers 102 and 202 control the storage units 101 and 201 and the transmission and reception units 103 and 203. Specifically, the controllers 102 and 202 perform the methods stored in the storage units 101 and 201, respectively. The controllers 102 and 202 transmit the above stated signals through the transmission and reception units 103 and 203.

The embodiments described below are provided by combining components and features of the present invention in specific forms. The components or features of the present invention can be considered optional unless explicitly stated otherwise. The components or features may be implemented without being combined with other components or features. The embodiments of the present invention may also be provided by combining some of the components and/or features. The order of the operations described below in the embodiments of the present invention may be changed. Some components or features of one embodiment may be included in another embodiment or may be replaced with corresponding components or features of another embodiment. It is obvious that the embodiments may be formed by combing claims which are not explicitly referred to each other, or may be included as new claims by voluntary amendment after application.

The embodiments of the present invention have been described focusing mainly on the data communication relationship between a terminal and a Base Station (BS). The BS is a terminal node in a network which performs communication directly with the terminal. Specific operations which have been described as being performed by the BS may also be performed by an upper node as needed.

The term "base station (BS)" may be replaced with another term such as "fixed station", "Node B", "eNode B (eNB)", or "access point". In addition, the term "terminal" may also be replaced with another term such as "User Equipment (UE)", Mobile Station (MS)", "Mobile Subscriber Station (MSS)", or "Subscriber Station (SS)".

Those skilled in the art will appreciate that the present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be embraced within the scope of the invention. In addition, claims which are not explicitly dependent on each other can be combined to provide an embodiment or new claims can be added through amendment after this application is filed.

The invention claimed is:

1. A method for reducing power consumption for cooperative transmission performance in a cooperative transmission system, the method comprising:
  receiving cooperative participation information including at least one of a number of times of participation in cooperative transmission and a period of participation in cooperative transmission from at least one cooperative transmission capable terminal;
  calculating a weight based on the received cooperative participation information;
  comparing the calculated weight with a threshold which becomes a criterion for determining whether to participate in the cooperative transmission; and
  determining terminals which will participate in the cooperative transmission by multiplying the calculated weight by a data transmission rate and/or an amount of data transmitted.

2. The method of claim 1, wherein the weight is calculated by formula 1 below:

$$W = \left\{ \frac{N_{CT}[i]}{(\text{avg}(N_{CT}))^\alpha} \right\}_T, \qquad \text{Formula 1}$$

wherein W is a weight on whether an $i^{th}$ terminal would participate in the cooperative transmission during a certain time T, T is a period during which a cooperative cluster is formed or a time of participating in the cooperative cluster itself, NCT[i] is a number of times or a period of participation in the cooperative transmission during period T, avg(NCT) is an average number of times of participation in the cooperative transmission of cooperating terminals within the cooperative cluster during period T, and $\alpha$ is a fairness exponent factor.

* * * * *